United States Patent
Hall et al.

(10) Patent No.: US 11,924,396 B2
(45) Date of Patent: Mar. 5, 2024

(54) NON-MECHANICAL BEAM STEERING ASSEMBLY

(71) Applicant: META PLATFORMS TECHNOLOGIES, LLC, Menlo Park, CA (US)

(72) Inventors: Michael Hall, Bellevue, WA (US); Qing Chao, Redmond, WA (US); Byron Taylor, Redmond, WA (US); Xinqiao Liu, Medina, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 248 days.

(21) Appl. No.: 17/579,279

(22) Filed: Jan. 19, 2022

(65) Prior Publication Data
US 2022/0141447 A1  May 5, 2022

Related U.S. Application Data

(63) Continuation of application No. 16/738,478, filed on Jan. 9, 2020, now Pat. No. 11,265,532, which is a
(Continued)

(51) Int. Cl.
*H04N 13/271* (2018.01)
*G01S 17/89* (2020.01)
(Continued)

(52) U.S. Cl.
CPC .......... *H04N 13/271* (2018.05); *G01S 17/89* (2013.01); *G02B 26/08* (2013.01);
(Continued)

(58) Field of Classification Search
CPC .............. G06F 3/0325; G02B 26/0808; H04N 13/383; H04N 13/344
See application file for complete search history.

(56) References Cited

U.S. PATENT DOCUMENTS 4,597,634 A * 7/1986 Steenblik ............. H04N 13/339
359/464
4,770,530 A   9/1988 Van Aken et al.
(Continued)

FOREIGN PATENT DOCUMENTS

CN   103053167 A   4/2013
CN   205157881 U   4/2016
(Continued)

OTHER PUBLICATIONS

Nathan Hagen, "Compound prism design principles, I", Jul. 12, 2011 (Year: 2011).*
(Continued)

*Primary Examiner* — Maurice C Smith
(74) *Attorney, Agent, or Firm* — Mannava & Kang, P.C.

(57) ABSTRACT

A depth camera assembly (DCA) for depth sensing of a local area. The DCA includes a transmitter, a receiver, and a controller. The transmitter illuminates a local area with outgoing light in accordance with emission instructions. The transmitter includes a fine steering element and a coarse steering element. The fine steering element deflects one or more optical beams at a first deflection angle to generate one or more first order deflected scanning beams. The coarse steering element deflects the one or more first order deflected scanning beams at a second deflection angle to generate the outgoing light projected into the local area. The receiver captures one or more images of the local area including portions of the outgoing light reflected from the local area. The controller determines depth information for one or more objects in the local area based in part on the captured one or more images.

20 Claims, 12 Drawing Sheets

Related U.S. Application Data continuation of application No. 15/696,907, filed on Sep. 6, 2017, now Pat. No. 10,574,973.

(51) Int. Cl.

| | | |
|---|---|---|
| *G02B 26/08* | (2006.01) | |
| *G02B 27/01* | (2006.01) | |
| *G02F 1/1347* | (2006.01) | |
| *G02F 1/139* | (2006.01) | |
| *G02F 1/29* | (2006.01) | |
| *G02F 1/33* | (2006.01) | |
| *G06F 3/03* | (2006.01) | |
| *G06T 7/521* | (2017.01) | |
| *H04N 13/207* | (2018.01) | |
| *H04N 13/344* | (2018.01) | |
| *H04N 13/383* | (2018.01) | |
| *G02B 26/00* | (2006.01) | |

(52) U.S. Cl.
CPC ..... *G02B 26/0808* (2013.01); *G02B 27/0101* (2013.01); *G02B 27/017* (2013.01); *G02F 1/13471* (2013.01); *G02F 1/1393* (2013.01); *G02F 1/292* (2013.01); *G02F 1/33* (2013.01); *G06F 3/0325* (2013.01); *G06T 7/521* (2017.01); *H04N 13/207* (2018.05); *H04N 13/344* (2018.05); *H04N 13/383* (2018.05); *G02B 26/004* (2013.01); *G02B 2027/0138* (2013.01); *G02B 2027/014* (2013.01); *G02F 2201/305* (2013.01)

(56) References Cited

U.S. PATENT DOCUMENTS

| | | |
|---|---|---|
| 6,052,189 A | 4/2000 | Fuse et al. |
| 6,208,466 B1 | 3/2001 | Liu et al. |
| 8,320,621 B2 | 11/2012 | McEldowney |
| 9,294,758 B2 | 3/2016 | Xiong et al. |
| 9,804,397 B2 | 10/2017 | Schowengerdt et al. |
| 9,946,071 B2 | 4/2018 | Schowengerdt |
| 10,027,386 B2 | 7/2018 | Kohli |
| 10,158,845 B2 | 12/2018 | Zhu et al. |
| 10,168,454 B2 | 1/2019 | Sugihara et al. |
| 10,181,200 B1 | 1/2019 | Chao et al. |
| 10,388,026 B1 | 8/2019 | Chao et al. |
| 10,410,373 B1 | 9/2019 | Hall et al. |
| 10,412,371 B1 | 9/2019 | Chao et al. |
| 10,473,935 B1 | 11/2019 | Gribetz et al. |
| 10,503,265 B2 | 12/2019 | Viswanathan |
| 10,574,973 B2 | 2/2020 | Hall et al. |
| 10,613,413 B1 | 4/2020 | Lu et al. |
| 10,740,915 B1 | 8/2020 | Chao et al. |
| 2003/0012657 A1 | 1/2003 | Marr et al. |
| 2004/0108971 A1 | 6/2004 | Waldern et al. |
| 2004/0233408 A1 | 11/2004 | Sievers |
| 2005/0122549 A1 | 6/2005 | Goulanian et al. |
| 2005/0174470 A1 | 8/2005 | Yamasaki |
| 2006/0028400 A1 | 2/2006 | Lapstun et al. |
| 2008/0236275 A1 | 10/2008 | Breed et al. |
| 2008/0246952 A1 | 10/2008 | Fenrich et al. |
| 2009/0135488 A1* | 5/2009 | Aota ................ G02B 27/42 359/569 |
| 2009/0316141 A1 | 12/2009 | Feldkhun |
| 2010/0091203 A1 | 4/2010 | Kobayashi et al. |
| 2010/0176102 A1 | 7/2010 | Petring et al. |
| 2010/0301023 A1 | 12/2010 | Unrath et al. |
| 2010/0304854 A1 | 12/2010 | McEldowney |
| 2011/0063705 A1 | 3/2011 | Tsukamoto et al. |
| 2011/0242298 A1 | 10/2011 | Bathiche et al. |
| 2011/0298918 A1 | 12/2011 | McEldowney |
| 2012/0307352 A1* | 12/2012 | Jain .................. G02B 27/4294 359/350 |
| 2013/0343705 A1 | 12/2013 | Vermeulen et al. |
| 2014/0035959 A1 | 2/2014 | Lapstun |
| 2014/0071456 A1 | 3/2014 | Podoleanu et al. |
| 2014/0192214 A1 | 7/2014 | Laroia |
| 2014/0293011 A1 | 10/2014 | Lohry et al. |
| 2014/0293737 A1 | 10/2014 | Sangawa et al. |
| 2015/0234477 A1 | 8/2015 | Abovitz et al. |
| 2015/0241705 A1 | 8/2015 | Abovitz et al. |
| 2015/0301338 A1 | 10/2015 | Van Heugten |
| 2015/0338718 A1 | 11/2015 | Zhang et al. |
| 2016/0012170 A1 | 1/2016 | Platzgummer |
| 2016/0026253 A1 | 1/2016 | Bradski et al. |
| 2016/0043350 A1 | 2/2016 | Cho et al. |
| 2016/0077338 A1 | 3/2016 | Robbins et al. |
| 2016/0097930 A1 | 4/2016 | Robbins et al. |
| 2016/0135688 A1 | 5/2016 | Ebisawa |
| 2016/0139402 A1 | 5/2016 | Lapstun |
| 2016/0198147 A1 | 7/2016 | Waligorski et al. |
| 2016/0249982 A1 | 9/2016 | Varghese et al. |
| 2016/0286202 A1 | 9/2016 | Romano et al. |
| 2016/0295201 A1 | 10/2016 | So et al. |
| 2016/0313244 A1 | 10/2016 | Shiono |
| 2017/0059960 A1 | 3/2017 | Shi et al. |
| 2017/0084044 A1 | 3/2017 | Keh et al. |
| 2017/0122728 A1 | 5/2017 | Kipfer et al. |
| 2017/0176575 A1 | 6/2017 | Smits |
| 2017/0195653 A1 | 7/2017 | Trail et al. |
| 2017/0214907 A1 | 7/2017 | Lapstun |
| 2017/0270637 A1 | 9/2017 | Perreault et al. |
| 2017/0301736 A1 | 10/2017 | Wang et al. |
| 2017/0322424 A1 | 11/2017 | Rossi |
| 2017/0328826 A1 | 11/2017 | Diebold et al. |
| 2017/0332071 A1 | 11/2017 | Ledentsov et al. |
| 2017/0350575 A1 | 12/2017 | Hill et al. |
| 2018/0061034 A1 | 3/2018 | Zhao et al. |
| 2018/0084245 A1 | 3/2018 | Lapstun |
| 2018/0131929 A1 | 5/2018 | Lee et al. |
| 2018/0143438 A1 | 5/2018 | Oh |
| 2018/0204340 A1 | 7/2018 | Zhao et al. |
| 2018/0227567 A1 | 8/2018 | Chao et al. |
| 2018/0232048 A1 | 8/2018 | Popovich et al. |
| 2018/0275409 A1 | 9/2018 | Gao et al. |
| 2018/0275410 A1 | 9/2018 | Yeoh et al. |
| 2019/0008388 A1 | 1/2019 | Ando et al. |
| 2019/0066316 A1 | 2/2019 | Bardagjy et al. |
| 2019/0075281 A1 | 3/2019 | Hall et al. |
| 2019/0086674 A1 | 3/2019 | Sinay et al. |
| 2019/0273114 A1 | 9/2019 | Liu |

FOREIGN PATENT DOCUMENTS

| | | |
|---|---|---|
| CN | 107250882 A | 10/2017 |
| CN | 107850780 A | 3/2018 |
| CN | 108027881 A | 5/2018 |
| CN | 108353115 A | 7/2018 |
| EP | 0903609 A1 | 3/1999 |

OTHER PUBLICATIONS

"3D Time of Flight (ToF) Sensors—Technology Comparison," Texas Instruments Incorporated, 1995-2017, 2 pages.

Cheng H.H., et al., "Concept for a Transmissive, Large Angle, Light Steering Device with High Efficiency," Optics Letters, May 1, 2015, vol. 40 (9), pp. 2079-2083.

Cheng H.H., et al., "Large Angle Image Steering Using a Liquid Crystal Device," SID International Symposium Digest of Technical Papers, Jun. 2014, vol. 45, Book II, pp. 739-742.

English Translation of CN205157881 cited in Jun. 21, 2021 IDS relied upon for Examination. (Year: 2016).

Final Office Action dated Feb. 19, 2021 for U.S. Appl. No. 16/917,705, filed Jun. 30, 2020, 6 pages.

Final Office Action dated Nov. 20, 2020 for U.S. Appl. No. 15/428,780, filed Feb. 9, 2017, 8 pages.

Final Office Action dated Feb. 28, 2019 for U.S. Appl. No. 15/643,912, filed Jul. 7, 2017, 6 pages.

Non-Final Office Action dated Sep. 24, 2020 for U.S. Appl. No. 15/428,780, filed Feb. 9, 2017, 15 pages.

(56) References Cited

OTHER PUBLICATIONS

Non-Final Office Action dated Dec. 26, 2018 for U.S. Appl. No. 15/643,912, filed Jul. 7, 2017, 6 pages.
Non-Final Office Action dated Jan. 26, 2021 for U.S. Appl. No. 16/917,705, filed Jun. 30, 2020, 13 pages.
Non-Final Office Action dated Dec. 3, 2021 for U.S. Appl. No. 16/797,679, filed Feb. 21, 2020, 12 pages.
Office Action dated May 14, 2021 for Chinese Application No. 201811031191.2, filed Sep. 5, 2018, 17 pages.
Office Action dated Sep. 28, 2020 for Chinese Application No. 201811031191.2, filed Sep. 5, 2018, 10 pages.
"Principle of Depth Sensors," Media Research Lab, undated, [Online], [Retrieved on Sep. 22, 2017], 4 pages, Retrieved from the internet: URL: http://homel.vsb.cz/~fus032/ano2/hct.pdf.
Provenzano C., et al., "Electrically Tunable Two-Dimensional Liquid Crystals Gratings Induced by Polarization Holography," Optics Express, OSA Publishing, Apr. 30, 2007, vol. 15 (9), pp. 5872-5878.
Time of Flight Sensors | Overview | Sensors | TI.com, Texas Instruments Incorporated [Online], 1995-2018, [Retrieved on Jun. 28, 2018], 2 pages, Retrieved from the Internet: URL: http://www.ti.com/lsds/ti/sensing-products/optical-sensors/3d-time-of-flight-sensors-technology-comparison.page.
Non-Final Office Action dated Mar. 17, 2022 for U.S. Appl. No. 17/203,049, filed Mar. 16, 2021, 13 pages.

\* cited by examiner

NON-MECHANICAL BEAM STEERING ASSEMBLY

CROSS REFERENCE TO RELATED APPLICATIONS

This application is a continuation of pending U.S. application Ser. No. 16/738,478, filed Jan. 9, 2020, which is a continuation of U.S. application Ser. No. 15/696,907, filed Sep. 6, 2017, now U.S. Pat. No. 10,574,973, which are incorporated by reference in its entirety.

BACKGROUND

The present disclosure generally relates to depth sensing, and specifically relates to a non-mechanical beam steering for depth sensing in virtual reality (VR) and augmented reality (AR) systems.

A fully addressable one-dimensional scanning or two-dimensional scanning process that runs at fast rates is desired for depth sensing in VR or AR systems. Much like human perception, the scanning system needs to operate in two modes: a large-scale mode for scanning of, e.g., walls, tables, chairs, and the like, and a small-scale mode for scanning of e.g., hands, surface reliefs, textures, and the like. A preferred scanning system would have the ability to quickly pull in large scale objects and then to dwell on fine details. A static depth sensing system that operates at a large and small scale typically puts the system design in conflict. On a transmitter side, a large number of individual beams required for accurate sampling reduces a power in each beam and a signal-to-noise ratio (SNR). To provide accurate sampling, a large amount of input power for generating scanning beams is required. A static depth sensing system with a wide field-of-view would lack resolution on a receiver side. Depth sensing systems that can both scan and dwell are typically mechanically based systems. However, a scanning pattern generated by a mechanical depth sensing system is static and cannot dwell on a particular location in a surrounding area.

The conventional approaches for solving the large scale—small scale conflict generally fall into three categories: large/full scale static room illumination, a fixed illumination obtained by a mechanically driven dynamic system, and a variable illumination obtained by a mechanically driven dynamic system. The conventional mechanically driven dynamic sensing system generates a fixed scanning pattern that can sweep a room volume. This approach reduces a required laser power and can provide enough detail to accurately reconstruct the volume. However, the mechanically driven dynamic sensing system generates a fixed scanning pattern and is not addressable. The system resolution is fixed by a number of spots in the fixed scanning pattern. The mechanically driven dynamic sensing system that generates a fixed scanning pattern is typically implemented with scanning mirrors. The conventional mechanically driven dynamic sensing system may also generate a variable scanning pattern that can sweep a room volume. This approach reduces a required laser power and can provide enough detail to accurately reconstruct the volume. However, the mechanically driven dynamic sensing system with the variable scanning pattern is slow and mechanically complex.

SUMMARY

A beam steering assembly directs outgoing light into a local area and receives portions of the outgoing light reflected from the local area. The beam steering assembly includes a transmitter, a receiver, and a controller. The beam steering assembly may be integrated into a depth camera assembly (DCA) that determines depth information for one or more objects in the local area.

The transmitter is configured to illuminate the local area with the outgoing light in accordance with emission instructions. The transmitter comprises an illumination source, a fine steering element, a coarse steering element, and a projection assembly. The illumination source is configured to emit one or more optical beams. In some embodiments, the illumination source directly generates the one or more optical beams as polarized light, e.g., based on a polarizing element integrated into the illumination source or placed in front of the illumination source. In alternate embodiments, the illumination source generates the one or more optical beams as unpolarized light. The fine steering element is configured to deflect, based in part on the emission instructions, the one or more optical beams at a first deflection angle to generate one or more first order deflected scanning beams. The one or more first order deflected scanning beams are coupled into the coarse steering element. The coarse steering element is configured to deflect the one or more first order deflected scanning beams at a second deflection angle larger than the first deflection angle to generate the outgoing light having a large angular spread. The coarse steering element may be based on, e.g., scanning lenses, a polarization grating stack, liquid crystal gratings, etc. In some embodiments, the coarse steering element deflects the one or more first order deflected scanning beams based in part on the emission instructions. The generated outgoing light having the large angular spread provides a wide field-of-view for scanning of the one or more objects in the local area. In some embodiments, the outgoing light is composed of one or more outgoing light beams. In alternate embodiments, the outgoing light is structured light of a defined pattern, e.g., a dot pattern or a line pattern. In some embodiments, the outgoing light is polarized light, e.g., circularly polarized light of a first handedness. The projection assembly is configured to project the outgoing light into the local area.

The receiver is configured to capture, in accordance with receiving instructions, one or more images of the local area including reflected light composed of portions of the outgoing light reflected from the local area. The reflected light captured by the receiver is reflected from the one or more objects in the local area. In some embodiments, the receiver includes a polarizing element for receiving the reflected light having a specific polarization and propagating the polarized reflected light. In some embodiments, the polarizing element is common for both the transmitter and the receiver. In some embodiments, the reflected light includes circularly polarized light, e.g., of a second handedness orthogonal to the first handedness of the outgoing light.

In some embodiments, the receiver comprises another coarse steering element, another fine steering element and a detector. The fine steering element of the transmitter and the other fine steering element of the receiver may represent a single component common for the transmitter and the receiver. Similarly, the coarse steering element of the transmitter and the other coarse steering element of the receiver may represent another single component common for the transmitter and the receiver. The other coarse steering element is configured to deflect the reflected light at a third deflection angle to generate one or more first order deflected reflecting beams. The one or more first order deflected reflecting beams are coupled into the other fine steering element. The other fine steering element is configured to deflect, based in part on the receiving instructions, the one or more first order deflected reflecting beams at a fourth deflection angle smaller than the third deflection angle to generate one or more second order deflected reflecting beams. The detector is configured to capture the one or more images by capturing the one or more second order deflected reflecting beams.

The controller may be coupled to both the transmitter and the receiver. The controller generates the emission instructions and the receiving instructions. The controller provides the emission instructions to one or more components of the transmitter, e.g., the illumination source, the fine steering element, and/or the coarse steering element. The controller may provide the receiving instructions to one or more components of the receiver, e.g., the other fine steering element and/or the other coarse steering element. The controller is also configured to determine depth information for the one or more objects based in part on the captured one or more images.

A head-mounted display (HMD) can further integrate the DCA with the beam steering assembly. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an exit pupil of the HMD corresponding to a location of a user's eye, the image light comprising the depth information of the one or more objects in the local area determined by the DCA with the beam steering assembly.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A beam steering assembly for directing one or more light beams into a local area and for receiving portions of the one or more light beams reflected from the local area. The beam steering assembly includes a fine steering element and a coarse steering element that generate one or more light beams from light emitted from a laser source. The fine steering element may be based on, e.g., an acousto-optic deflector. The coarse steering element may be based on, e.g., scanning lenses, a polarization grating stack, liquid crystal gratings, etc. The beam steering assembly projects the generated one or more light beams into one or more objects in the local area. The beam steering assembly further receives portions of the one or more light beams reflected from the one or more objects in the local area, and propagates the portions of the reflected one or more light beams to a detector (camera). The detector captures the portions of the reflected one or more light beams. Note that the portions of the one or more light beams can be also scattered from one or more objects in the local area, wherein scattering represents a form of diffuse reflection. A controller coupled to the detector determines depth information in relation to the one or more objects in the local area based on the captured portions of the reflected one or more light beams.

In some embodiments, the beam steering assembly is part of a depth camera assembly (DCA) integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an exit pupil of the HMD corresponding to a location of a user's eye, the image light comprising the depth information of the objects in the local area determined by the DCA.

Figure 1:
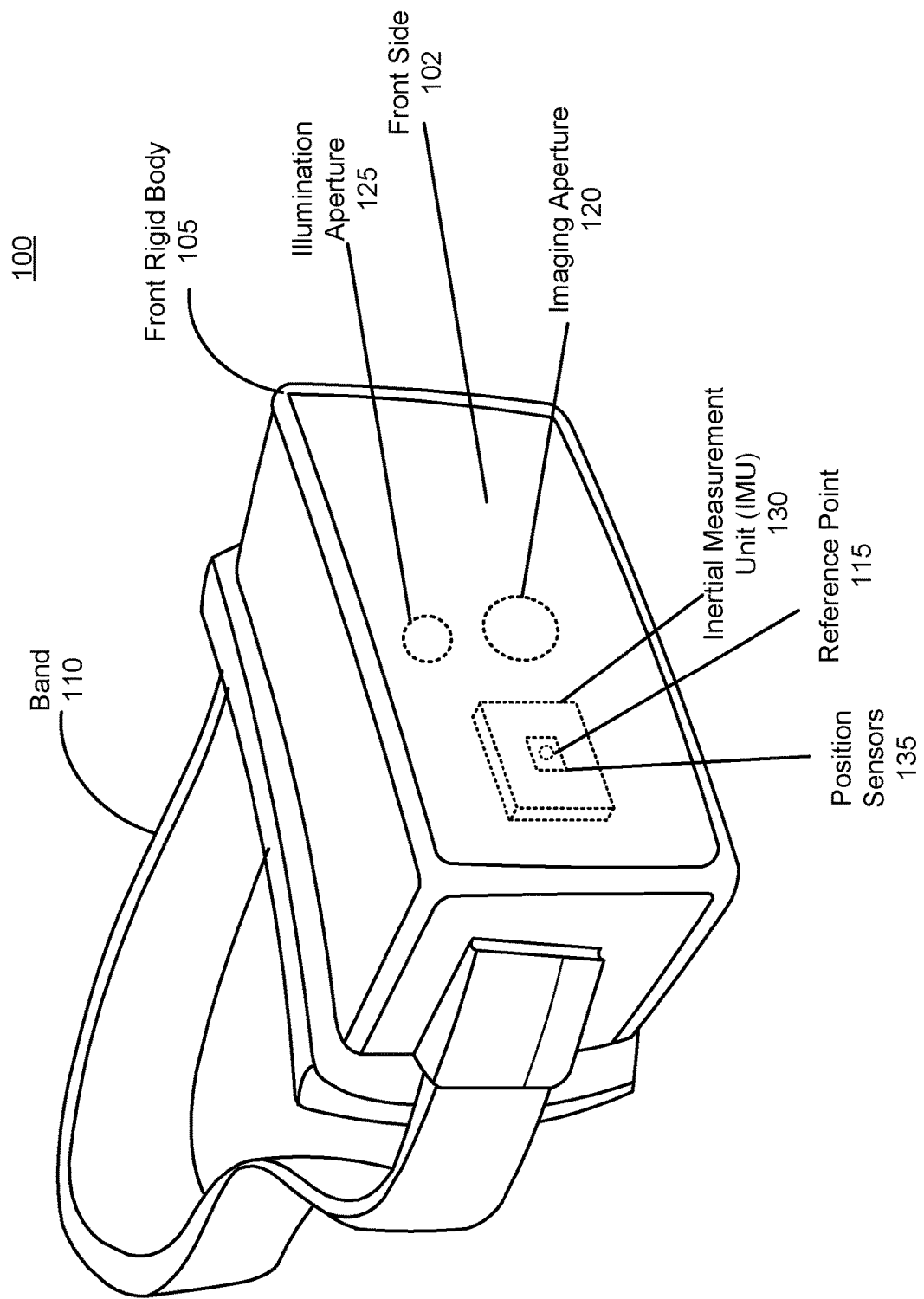
FIG. 1 is a diagram of a head-mounted display (HMD), in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 also includes a DCA configured to determine depth information of a local area surrounding some or all of the HMD 100. The HMD 100 also includes an imaging aperture 120 and an illumination aperture 125, and an illumination source of the DCA emits light through the illumination aperture 125. An imaging device of the DCA captures light from the illumination source that is reflected from the local area through the imaging aperture 120. Light from the local area received through the imaging aperture 120 and captured by the imaging device of the DCA includes portions of the light reflected from one or more objects in the local area. The imaging device of the DCA detects the portions of the light reflected from the one or more objects in the local area, as discussed in more detail in conjunction with FIGS. 2-5.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
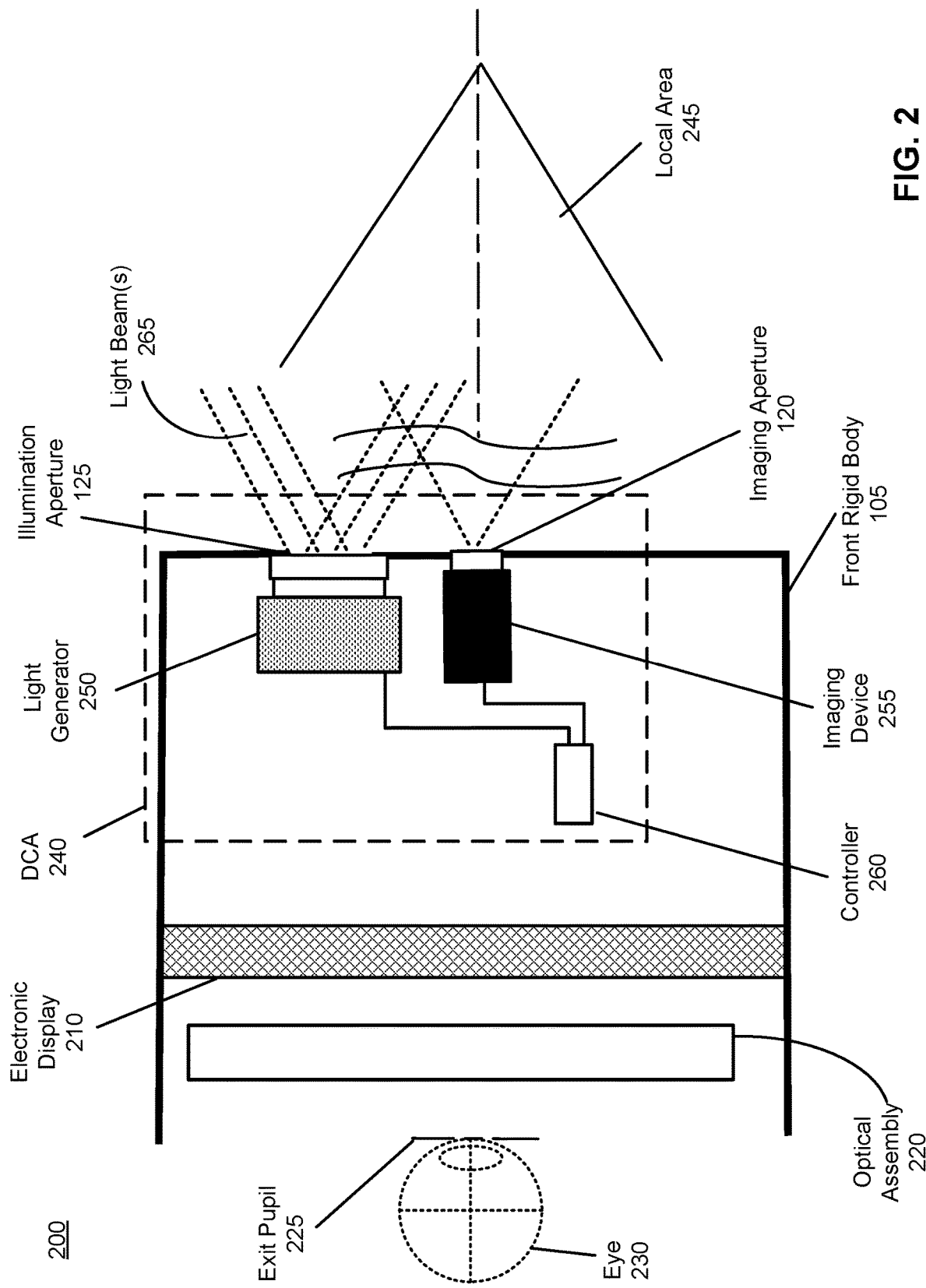
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an electronic display 210 and an optical assembly 220 that together provide image light to an exit pupil 225. The exit pupil 225 is a region in space that would be occupied by a user's eye 230. In some cases, the exit pupil 225 may also be referred to as an eye-box. For purposes of illustration, FIG. 2 shows a cross section 200 associated with a single eye 230, but another optical assembly 220, separate from the optical assembly 220, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 240 for determining depth information of one or more objects in a local area 245 surrounding some or all of the HMD 100. The DCA 240 includes a light generator 250, an imaging device 255, and a controller 260 that may be coupled to both the light generator 250 and the imaging device 255. The light generator 250 emits one or more light beams 265 through the illumination aperture 125. The light generator 250 illuminates the local area 245 with the one or more light beams 265 in accordance with emission instructions generated by the controller 260. The light generator 250 can be part of a transmitter of a beam steering assembly incorporated into the DCA 240, as discussed in more detail in conjunction with FIGS. 3A-3F, FIGS. 4A-4B, FIG. 5.

The light generator 250 may include a plurality of emitters that each emits light having certain characteristics (e.g., wavelength, polarization, coherence, pulse width, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 250 can emit the one or more light beams 265 that form a structured light pattern, e.g., a dot pattern. In some embodiments, the light generator 250 includes a laser diode (e.g., infrared laser diode) and a polarizing element for generating the one or more light beams 265 as polarized light, as disclosed in more detail in conjunction with FIGS. 4A-4B, FIG. 5.

The imaging device 255 is configured to capture, through the imaging aperture 120, portions of the one or more light beams 265 reflected from the local area 245. In some embodiments, the imaging device 255 includes a detector (not shown in FIG. 2) implemented as a dense array of Single Photon Avalanche Diode (SPAD) pixels or as a Silicon Photomultiplier (SiPM). In some other embodiments, the imaging device 255 includes a charge-coupled device (CCD) camera or a complementary metal-oxide-semiconductor (CMOS) camera. The imaging device 255 may also include a polarization sensitive photodetector that uses, e.g., optically anisotropic materials to detect photons of a specific polarization, e.g., linear, circular, elliptical, etc. The imaging device 255 captures one or more images of one or more objects in the local area 245 illuminated with the one or more light beams 265. In some embodiments, the imaging device 255 shares a fine steering element (not shown in FIG. 2) and a coarse steering element (not shown in FIG. 2) with the light generator 250 for propagating the portions of the one or more light beams 265 reflected from the local area 245 to a photodetector of the imaging de ice 255. The imaging device 255 can be part of a receiver of a beam steering assembly incorporated into the DCA 240, as discussed in more detail in conjunction with FIGS. 4A-4B, FIG. 5.

The controller 260 may control operation of certain components of the light generator 250, based on the emission instructions. In some embodiments, the controller 260 may provide the emission instructions to a fine steering element (not shown in FIG. 2) and/or a coarse steering element (not shown in FIG. 2) within the light generator 250 to control a field-of-view of the local area 245 illuminated by the one or more light beams 265. More details about controlling the fine steering element and/or the coarse steering element of the light generator 250 by the controller 260 are disclosed in conjunction with FIGS. 3A-3F, FIGS. 4A-4B, FIG. 5.

The controller 260 is configured to determine depth information for the one or more objects in the local area 245 based at least in part on the captured portions of the one or more reflected light beams. In some embodiments, for depth sensing based on time-of-flight, the controller 260 determines the depth information based on charges stored in storage bins associated with one or more pixels in the detector of the imaging device 255 over a defined amount of time. In alternate embodiments, for depth sensing based on structured illumination, the controller 260 determines the depth information based on phase-shifted patterns of the portions of the one or more reflected light beams distorted by shapes of the objects in the local area 245, and to use triangulation calculation to obtain a depth map of the local area 245. In some embodiments, the controller 260 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 210.

In some embodiments, the front rigid body 105 further comprises an eye tracking system (not shown in FIG. 2) that determines eye tracking information for the user's eye 230. The determined eye tracking information may comprise information about an orientation of the user's eye 230 in an eye-box, i.e., information about an angle of an eye-gaze. An eye-box represents a three-dimensional volume at an output of a HMD in which the user's eye is located to receive image light. In one embodiment, the user's eye 230 is illuminated with a structured light pattern. Then, the eye tracking system can use locations of the reflected structured light pattern in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optical assembly 220 based on the determined eye tracking information. In another embodiment, the vari-focal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3A:
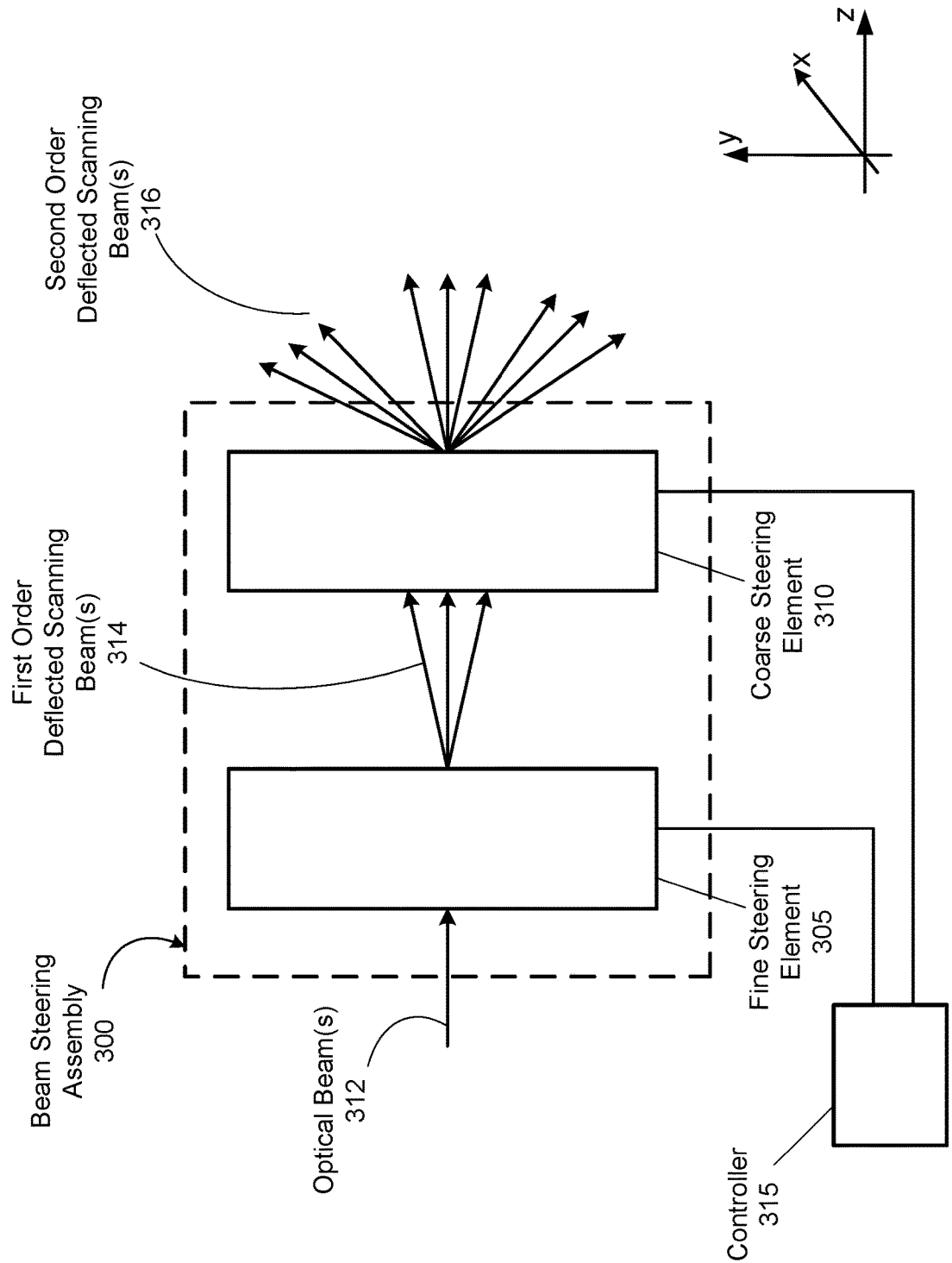
FIG. 3A is a beam steering assembly that includes a fine steering element and a coarse steering element, which may be integrated into a depth camera assembly (DCA), in accordance with an embodiment.

FIG. 3A illustrates an example beam steering assembly 300, which may be part of the DCA 240 in FIG. 2, in accordance with an embodiment. The beam steering assembly 300 cascades a fine steering element 305 with a coarse steering element 310. The fine steering element 305 deflects one or more optical beams 312 emitted from an illumination source (not shown in FIG. 3A) to generate one or more first order deflected scanning beams 314. The fine steering element 305 may be configured to rapidly change a scanning angle of the one or more first order deflected scanning beams 314 over a limited range (e.g., between −10 degrees and +10 degrees), based in part on emission instructions from a controller 315. The fine steering element 305 is thus configured to operate at a high rate and can dwell or step adaptively, e.g., based in part on the emission instructions from the controller 315. It should be understood that deflection in relation to the fine steering element 305 is a general term that can also refer to other physical effects, such as refraction, reflection or diffraction, depending on an exact physical element used as the fine steering element 305.

In some embodiments, the fine steering element 305 can be implemented based upon one or more acousto-optic devices. In one embodiment, the fine steering element 305 is implemented as an acousto-optic deflector operating in the Bragg regime. In another embodiment, the fine steering element 305 is implemented as a surface acoustic wave (SAW) deflector. In yet another embodiment, the fine steering element 305 is implemented as a thin grating operating in the Raman-Nath regime. In general, the fine steering element 305 is configured to function as a dynamic diffraction grating that diffracts the one or more optical beams 312 to form the one or more first order deflected scanning beams 314 based in part on the emission instructions from the controller 315. More details about the fine steering element 305 that functions as a dynamic diffraction grating are disclosed in conjunction with FIG. 3B.

The coarse steering element 310 deflects the one or more first order deflected scanning beams 314 to generate one or more second order deflected scanning beams 316 to allow scanning over a large angular range, e.g., between −60 degrees and +60 degrees along both x and y dimensions (horizontal and vertical dimensions). It should be understood that deflection in relation to the coarse steering element 310 is a general term that can also refer to other physical effects, such as refraction, reflection or diffraction, depending on an exact physical element used as the coarse steering element 310. The one or more second order deflected scanning beams 316 represent an embodiment of the one or more light beams 265 emitted by the DCA 240 in FIG. 2. In some embodiments, the one or more second order deflected scanning beams 316 represent structured light having, e.g., a dot pattern or a line pattern. By combining the fine steering element 305 providing a small angular spread with the coarse steering element 310 providing a larger angle deviation, the beam steering assembly 300 is flexible in that the one or more generated second order deflected scanning beams 316 can be projected in different areas of a volume. It should be understood that implementation requirements on the combination of fine steering element 305 and coarse steering element 310 may depend on specifications of performance and constraints related to the beam steering assembly 300. One particular implementation method can be chosen over another for different reasons, including ability to reach a particular angular range amplification from the fine steering element 305 to the coarse steering element 310 (e.g., amplification of six times), a switching speed, a power consumption, a size/weight of components of the beam steering assembly 300, etc.

In some embodiments, the coarse steering element 310 covers a wide range of rates. For example, a scanning speed of the coarse steering element 310 varies from matching that of the fine steering element 305 implemented based upon one or more acousto-optic devices (e.g., MHz scanning speed) to sub-kHz scanning speed. In one embodiment, the coarse steering element 310 is implemented based on scanning lenses, as discussed in more detail in conjunction with FIG. 3C. In another embodiment, the coarse steering element 310 is implemented as a liquid lens deflector, as discussed in more detail in conjunction with FIG. 3D. In yet another embodiment, the coarse steering element 310 is implemented based on polarization grating stacks, as discussed in more detail in conjunction with FIGS. 3E-3F.

Figure 3B:
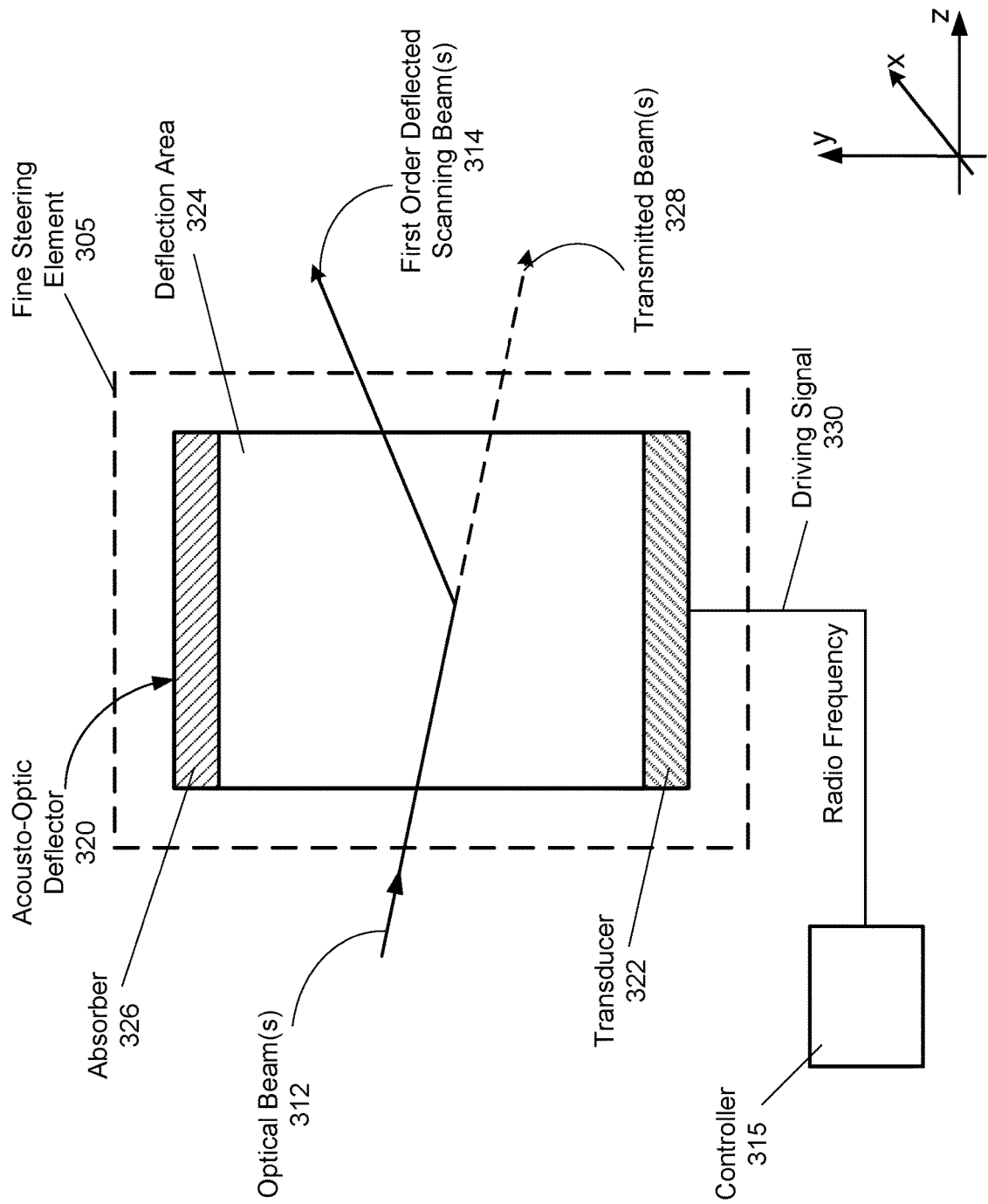
FIG. 3B is an example fine steering element of the beam steering assembly in FIG. 3A based on an acousto-optic deflector, in accordance with an embodiment.

FIG. 3B illustrates an example of the fine steering element 305 in FIG. 3A implemented based on an acousto-optic deflector 320, in accordance with embodiments of the present disclosure. The acousto-optic deflector 320 includes a transducer 322, a deflection area 324, and an optional absorber 326. Responsive to a radio frequency in the emission instructions from the controller 315, a crystal in the deflection area 324 vibrates and generates compression (sound) waves in the deflection area 324 that form a dynamic diffraction grating. The compression waves propagating through the deflection area 324 lead to a change in density of the deflection area 324 and therefore a change in a diffraction index which causes the crystal in the deflection area 324 to act like a diffraction grating. Based on a radio frequency in the emission instructions from the controller 315, the acousto-optic deflector 320 deflects the one or more optical beams 312 by a specific deflection angle to generate the one or more first order deflected scanning beams 314. In addition to the one or more first order deflected scanning beams 314, the acousto-optic deflector 320 may propagate through the deflection area 324 a portion of the one or more incident optical beams 312 as one or more transmitted beams 328 (zero order beams) without any deflection.

The acousto-optic deflector 320 can scan the one or more first order deflected scanning beams 314 at a high rate, e.g., in the MHz range. In addition, the acousto-optic deflector 320 is dynamically driven, e.g., based on a driving signal 330 having a radio frequency controlled based on the emission instructions from the controller 315. By varying the radio frequency of the driving signal 330, the controller 315 can dynamically change a deflection angle provided by the acousto-optic deflector 320. Thus, the fine steering element 305 based on the acousto-optic deflector 320 can adaptively dwell and address any portion of a volume within its angular range. In some embodiments, the acousto-optic deflector 320 is configured to run a high density angular sweep over its angular range. In alternate embodiments, the acousto-optic deflector 320 is configured to run a coarse angular sweep over its angular range. In some embodiments, the acousto-optic deflector 320 operating in the Bragg regime can scan a single light beam across a full angular spread sequentially by changing a radio frequency of the driving signal 330. In alternate embodiments, the acousto-optic deflector 320 can operate in the Raman-Nath regime.

The acousto-optic deflector 320 in FIG. 3B may possess operational flexibility depending on design objectives of the beam steering assembly 300 in FIG. 3A and/or the DCA 240 in FIG. 2. In one embodiment, the beam steering assembly 300 and/or the DCA 240 can be designed to operate as a line scanner by using the acousto-optic deflector 320 to deflect the one or more optical beams 312. In this case, a cylinder lens (not shown in FIG. 3B) can be employed, e.g., in front of the acousto-optic deflector 320, to produce a line scan across the acousto-optic deflector 320. In another embodiment, the acousto-optic deflector 320 can be designed to operate as a one-dimensional scanner different from a line scanner. In yet another embodiment, instead of a single acousto-optic deflector 320, the fine steering element 305 includes a pair of acousto-optic devices (not shown in FIG. 3B) whose axes of orientation are orthogonal to each other. Accordingly, one acousto-optic device deflects light in one dimension (e.g., x) and the second acousto-optic device deflects the x-deflected light along an orthogonal dimension (e.g., y), thereby generating the first order deflected scanning beams 314 as two-dimensional scanning beams for two-dimensional random scanning. Similarly, the coarse steering element 310 in FIG. 3A can be configured to expand scanning angles of the two-dimensional first order scanning beams 314 along both x and y dimensions to obtain the second order deflected scanning beams 316 covering a wide field-of-view along both x and y dimensions.

Figure 3C:
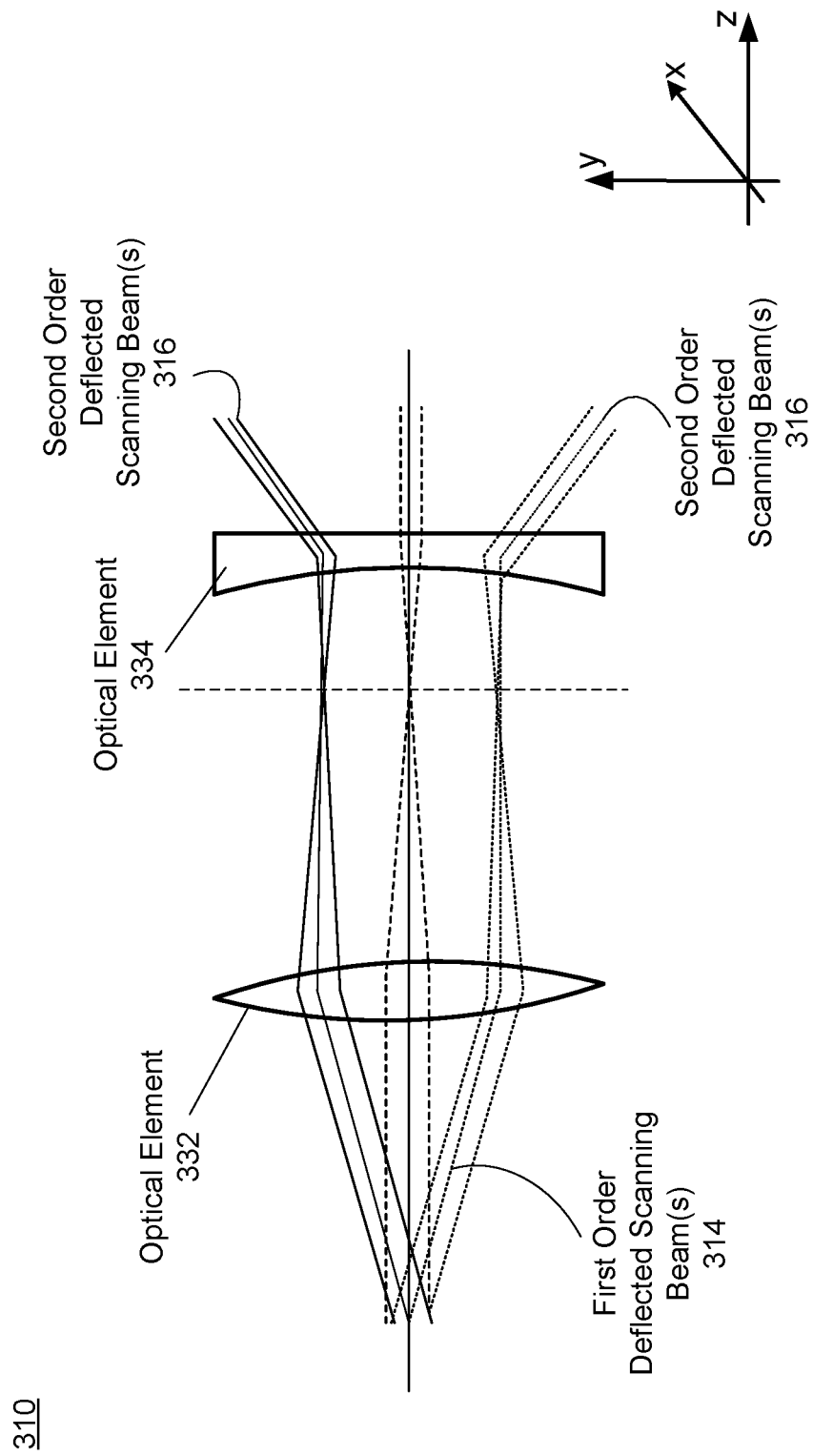
FIG. 3C is an example coarse steering element of the beam steering assembly in FIG. 3A based on scanning lenses, in accordance with an embodiment.

FIG. 3C illustrates the coarse steering element 310 in FIG. 3A implemented based on a pair of scanning lenses, in accordance with an embodiment. As shown in FIG. 3C, the one or more first order deflected scanning beams 314 generated by the fine steering element 305 in FIG. 3A are collected by a first optical element 332 (e.g., convex lens) and directed toward a second optical element 334 (e.g., concave lens). The second optical element 334 is configured to further deflect (i.e., refract) the one or more first order deflected scanning beams 314 to generate the one or more second order deflected scanning beams 316 having a large angular spread. The angular spread of the one or more second order deflected scanning beams 316 may depend on a design of each scanning lens 332, 334. The coarse steering element 310 implemented based on the scanning lenses 332, 334 may receive the one or more first order deflected scanning beams 314 having a total deflection range of, e.g., 10 degrees, and the scanning lenses 332, 334 may generate the one or more second order deflected scanning beams 316 having a total deflection range of, e.g., 60 degrees. In some embodiments, even higher amplification of the total deflection range is possible by applying different design trade-offs and/or coarse deflection. In some embodiments, focal planes of both scanning lenses 332, 334 coincide.

While a double sided convex lens 332 is shown in FIG. 3C, the optical element 332 can be implemented as a single sided convex lens or a Fresnel lens. Although the outer surface of the concave lens 334 is shown in FIG. 3C as flat, the outer surface of the concave lens 334 can be also curved. In some embodiments, the lenses 332, 334 can be implemented as meniscus lenses. In one embodiment, the lenses 332, 334 are implemented as spherical lenses. In another embodiment, the lenses 332, 334 are implemented as aspherical lenses. In yet another embodiment, the lenses 332, 334 are implemented with free-form surfaces. As the lenses 332, 334 are passive, the lenses 332, 334 may operate faster than other active systems, at potential expense of directional control. Furthermore, as being passive components, the lenses 332, 334 can operate without any emission instructions from the controller 315. In other embodiments, at least one of the optical elements 332, 334 of the coarse steering element 310 can be implemented using at least one mirror (not shown in FIG. 3C). Alternatively, at least one of the optical elements 332, 334 can be implemented as a combination of one or more mirrors and one or more lenses (not shown in FIG. 3C).

Figure 3D:
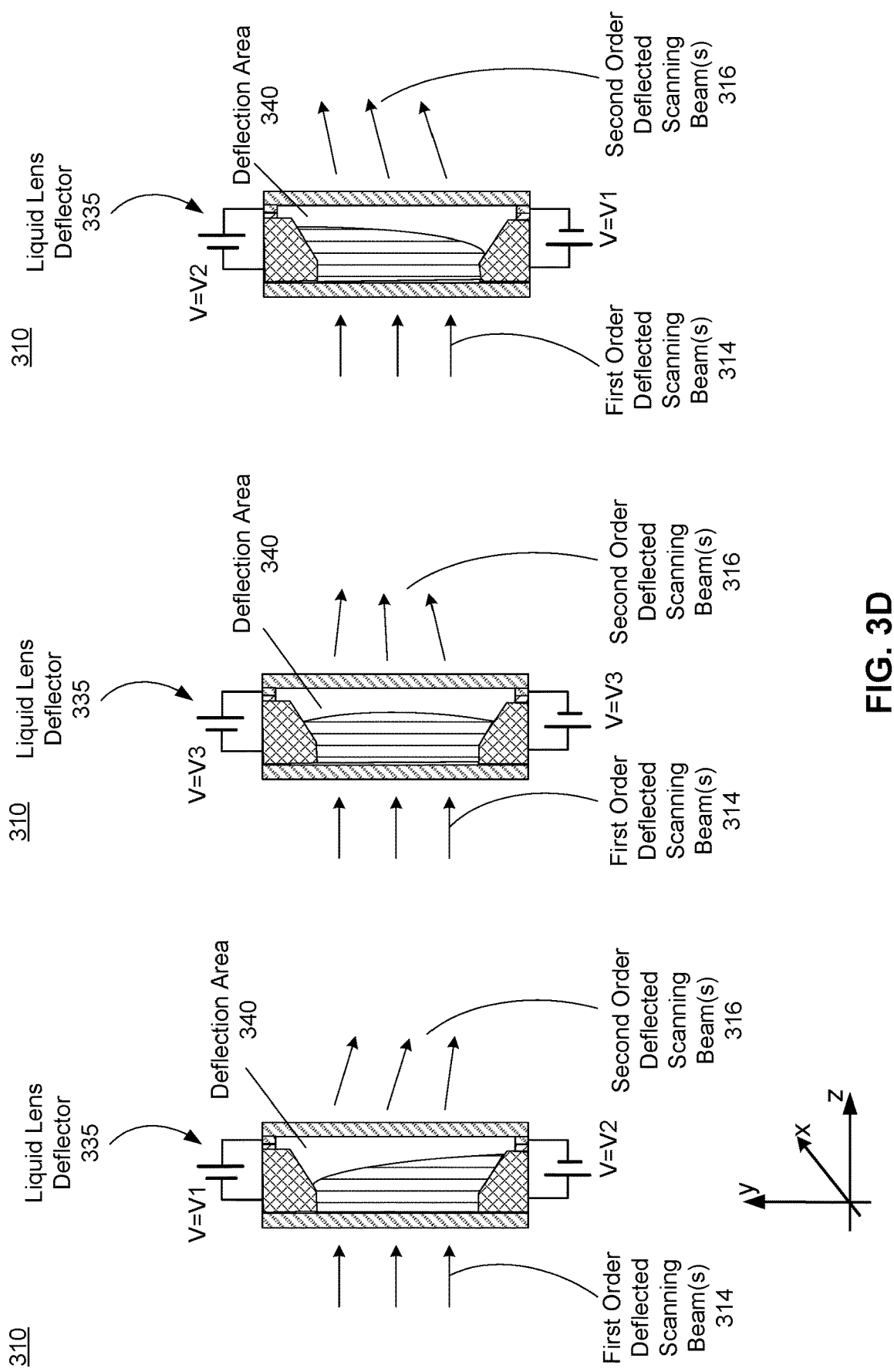
FIG. 3D is an example coarse steering element of the beam steering assembly in FIG. 3A based on a liquid lens deflector, in accordance with an embodiment.

FIG. 3D illustrates the coarse steering element 310 in FIG. 3A implemented based on a liquid lens deflector 335, in accordance with an embodiment. The liquid lens deflector 335 includes a deflection area 340 with one or more types of liquid crystals. A deflection index of the deflection area 340 and consequently a deflection angle of the liquid lens deflector 335 varies based on an electric field (voltage) applied to the deflection area 340 controlled based in part on the emission instructions from the controller 315. In some embodiments, the deflection area 340 includes oil and water, or some combination of water and membrane. FIG. 3D shows three illustrative embodiments where the first order deflected scanning beams 314 are deflected (i.e., refracted) by the liquid lens deflector 335 at three different deflection angles, based on different voltage levels applied to the deflection area 340, e.g., V1=60V, V2=30V, V3=45V. Thus, the coarse steering element 310 implemented as the liquid lens deflector 355 in FIG. 3D can operate as a dynamic deflection element that provides dynamic steering of the one or more first order deflected scanning beams 314 to generate the one or more second order deflected scanning beams 316 having a large angular spread. In some embodiments, an angular spread of the one or more second order deflected scanning beams 316 can be up to ±90 degrees (180 degrees), which may be achieved by stacking multiple liquid lens deflectors 335 (not shown in FIG. 3D). In some embodiments, the liquid lens deflector 335 can simultaneously change tilt along both x and y dimensions. Additionally or alternatively, the liquid lens deflector 335 may vary focus of the one or more second order deflected scanning beams 316. In some embodiments, the liquid lens deflector 335 has switching times in the order of tens of ms, an aperture in the order of 5 mm, and a thickness in the order of fractions of mm. In some other embodiments, the liquid lens deflector 335 used in an oscillatory manner can have a fast switching speed, e.g., in the order of several kHz.

Figure 3E:
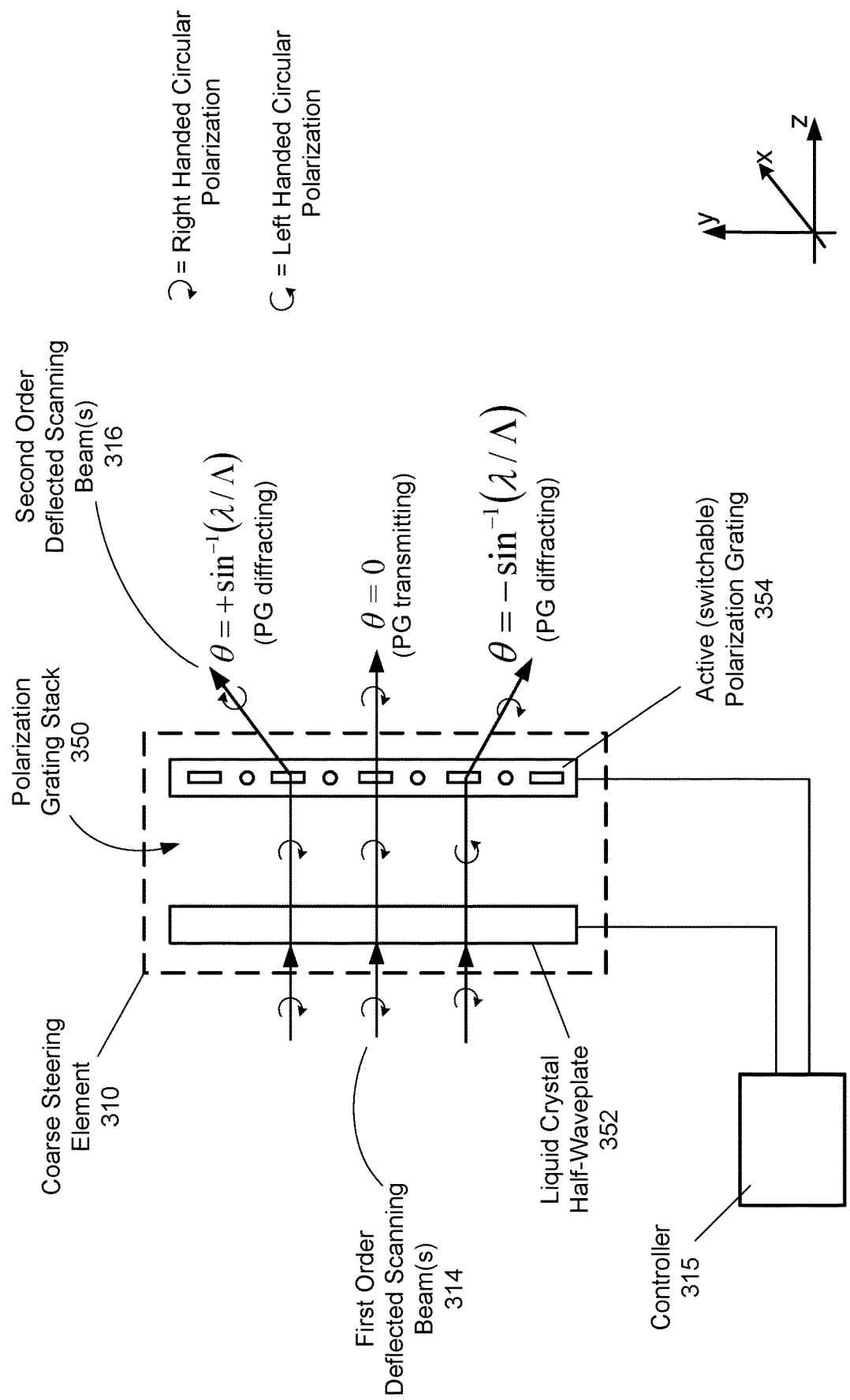
FIG. 3E is an example coarse steering element of the beam steering assembly in FIG. 3A based on a polarization grating stack, in accordance with an embodiment.

FIG. 3E illustrates the coarse steering element 310 in FIG. 3A implemented based on a polarization grating stack 350, in accordance with an embodiment. The polarization grating stack 350 includes a liquid crystal half-waveplate 352 coupled to a switchable polarization grating 354.

The liquid crystal half-waveplate 352 is an optical element that couples in the one or more first order deflected scanning beams 314 (incident light) and changes polarization of the incident light (if it is in active state). A phase shift between polarization components of the incident light and light output from the liquid crystal half-waveplate 352 may be, e.g., 90 degrees or 180 degrees. The liquid crystal half-waveplate 352 changes polarization of the incident light based on an orientation and/or a thickness of a crystal of the liquid crystal half-waveplate 352. The orientation and/or the thickness of the crystal can be controlled based at least in part on the emission instructions from the controller 315. The liquid crystal half-waveplate 352 is switchable, and a state of the liquid crystal half-waveplate 352 may be controlled based in part on the emission instructions from the controller 315. When in inactive state, the liquid crystal half-waveplate 352 does not change polarization of incident light. When in active state, the liquid crystal half-waveplate 352 changes a handedness of incident light, e.g., right handed circularly polarized light becomes left handed circularly polarized light and vice versa.

The polarization grating 354 is an optical element that combines functions of a polarizer and a beam splitter. In some embodiments, the polarization grating 354 is implemented as a Pancharatnam-Berry Phase (PBP) liquid crystal grating. In alternate embodiments, the polarization grating 354 is implemented as a thin film prism. The polarization grating 354 diffracts incident light coming from the liquid crystal half-waveplate 352 at a certain diffraction angle and produces the one or more second order deflected scanning beams 316. A diffraction angle of the polarization grating 354 may be determined based on design of the polarization grating 354, e.g., based on design of the thin film, or based on a value of crystal pitch Λ. In addition, the diffraction angle may depend on a wavelength λ of the incident light. The polarization grating 354 is switchable, and a state of the polarization grating 354 may be controlled based in part on the emission instructions from the controller 315. When in inactive state, the polarization grating 354 may not diffract incident light and does not change polarization of the incident light. When in active state, the polarization grating 354 diffracts incident light and may generate diffracted light having different polarization relative to the incident light.

In one embodiment, when the polarization grating 354 is in inactive state (e.g., controlled by the controller 315), the incident light coming from the liquid crystal half-waveplate 352 propagates through the polarization grating 354 without being diffracted, i.e., a diffraction angle θ is zero. In another embodiment, the liquid crystal half-waveplate 352 is in inactive state and does not change a handedness of the one or more incident first order deflected scanning beams 314, e.g., light output from the liquid crystal half-waveplate 352 is right handed circularly polarized. In this case, the polarization grating 354 diffracts the right handed circularly polarized light at a positive diffraction angle θ. In yet another embodiment, the liquid crystal half-waveplate 352 is in active state and changes a handedness of the one or more incident first order deflected scanning beams 314, e.g., light output from the liquid crystal half-waveplate 352 is now left handed circularly polarized. In this case, the polarization grating 354 diffracts the left handed circularly polarized light at a negative diffraction angle θ and produces right handed circularly polarized light. In some embodiments, the polarization grating stack 350 provides the diffraction angle θ in the order of tens of degrees.

Figure 3F:
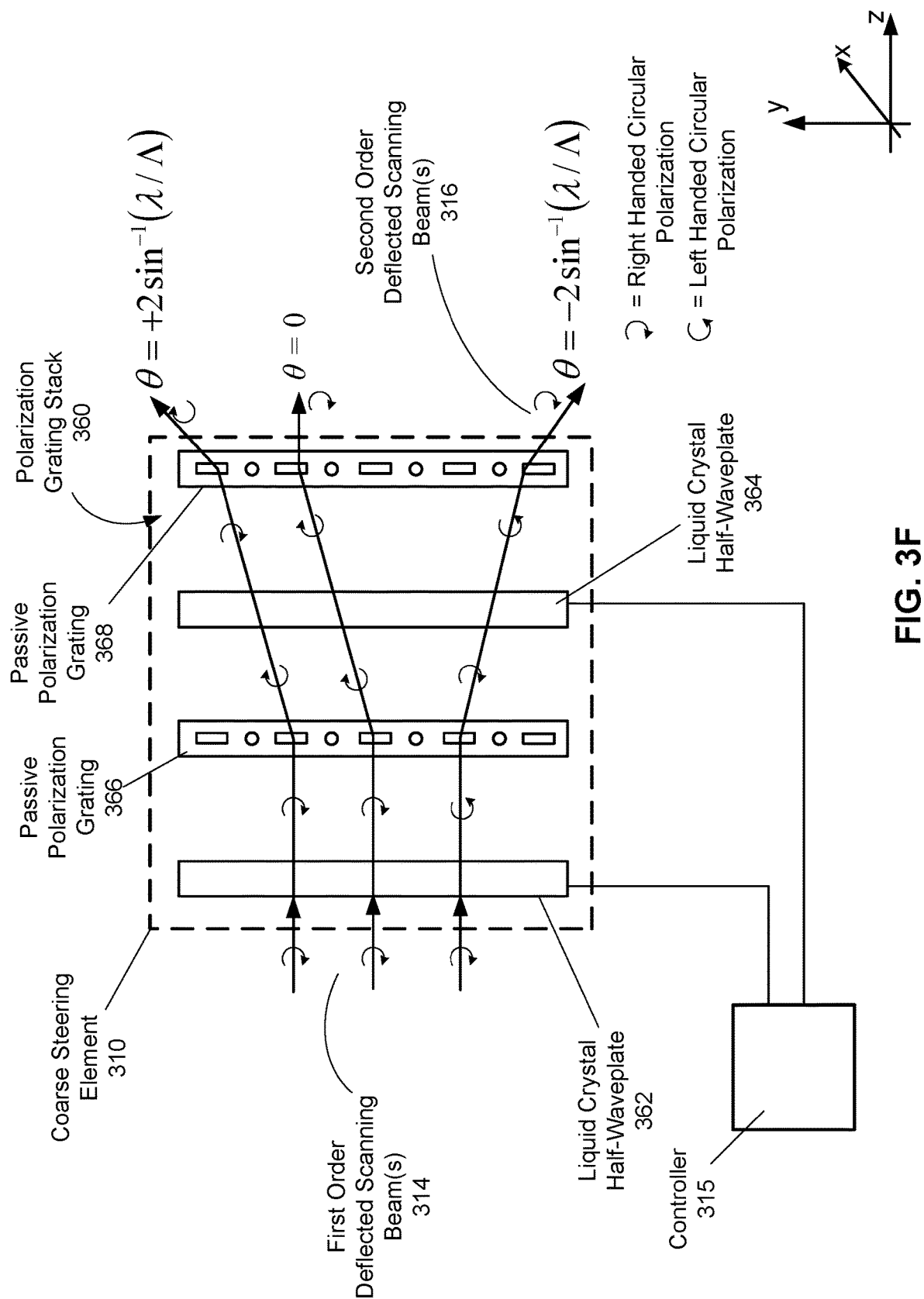
FIG. 3F is an example coarse steering element of the beam steering assembly in FIG. 3A based on another polarization grating stack, in accordance with an embodiment.

FIG. 3F illustrates the coarse steering element 310 in FIG. 3A implemented based on a polarization grating stack 360, in accordance with an embodiment. The polarization grating stack 360 includes a pair of liquid crystal half-waveplates 362, 364 coupled to a pair of passive (e.g., polymer based) polarization gratings 366, 368.

Each liquid crystal half-waveplate 362, 364 can be implemented in the same manner as the liquid crystal half-waveplate 352 of the polarization grating stack 350 in FIG. 3E. The liquid crystal half-waveplates 362, 364 are switchable, and configuration states of the liquid crystal half-waveplates 362, 364 can be controlled by the controller 315. When in inactive state, the liquid crystal half-waveplates 362, 364 do not change polarization of incident light. When in active state, each liquid crystal half-waveplates 362, 364 may change a handedness of incident light, e.g., right handed circularly polarized light becomes left handed circularly polarized light and vice versa.

In some embodiments, the polarization gratings 366, 368 are implemented as a PBP liquid crystal grating. In alternate embodiments, the polarization gratings 366, 368 implemented as a thin film prism. Each polarization grating 366, 368 diffracts incident light coming from a corresponding liquid crystal half-waveplate at a certain diffraction angle. A diffraction angle of the polarization grating 366, 368 may be determined based on design of the polarization grating 366, 368, e.g., based on design of the thin film, or based on a value of crystal pitch Λ. In addition, the diffraction angle may depend on a wavelength λ of the incident light. The polarization gratings 366, 368 shown in FIG. 3F are implemented as passive, i.e., the polarization gratings 366, 368 do not change polarization of diffracted light. In some embodiments, the polarization gratings 366, 368 provide the same amount of diffraction. In alternate embodiments, the polarization gratings 366, 368 provide different amounts of diffraction. In some embodiments, the polarization grating stack 360 provides a total diffraction angle θ in the order of tens of degrees.

Depending on state configurations of the crystal half-waveplates 362, 364, the polarization grating stack 360 provides one of three types of diffraction—positive, zero, or negative, as shown in FIG. 3F. In one embodiment, when the crystal half-waveplates 362, 364 are both in inactive states, the polarization gratings 366, 368 provide zero diffraction. In another embodiment, when the crystal half-waveplate 362 is in inactive state and the crystal half-waveplate 364 is in active state, the polarization gratings 366, 368 provide positive diffraction. In yet another embodiment, when the crystal half-waveplates 362, 364 are both in active states, the polarization gratings 366, 368 provide negative diffraction.

In alternate embodiments (not shown in FIG. 3F), the polarization gratings 366, 368 are active, i.e., switchable. Configuration states of the polarization gratings 366, 368 may be controlled by the controller 315. The combination of active polarization gratings 366, 368 and the liquid crystal half-waveplates 362, 364 can provide gradations in an amount of diffraction. For example, instead of having three types of diffraction shown in FIG. 3F, the polarization grating stack 360 with active polarization gratings 366, 368 may provide five types of diffraction, i.e., larger positive, smaller positive, zero, smaller negative and larger negative.

Figure 4A:
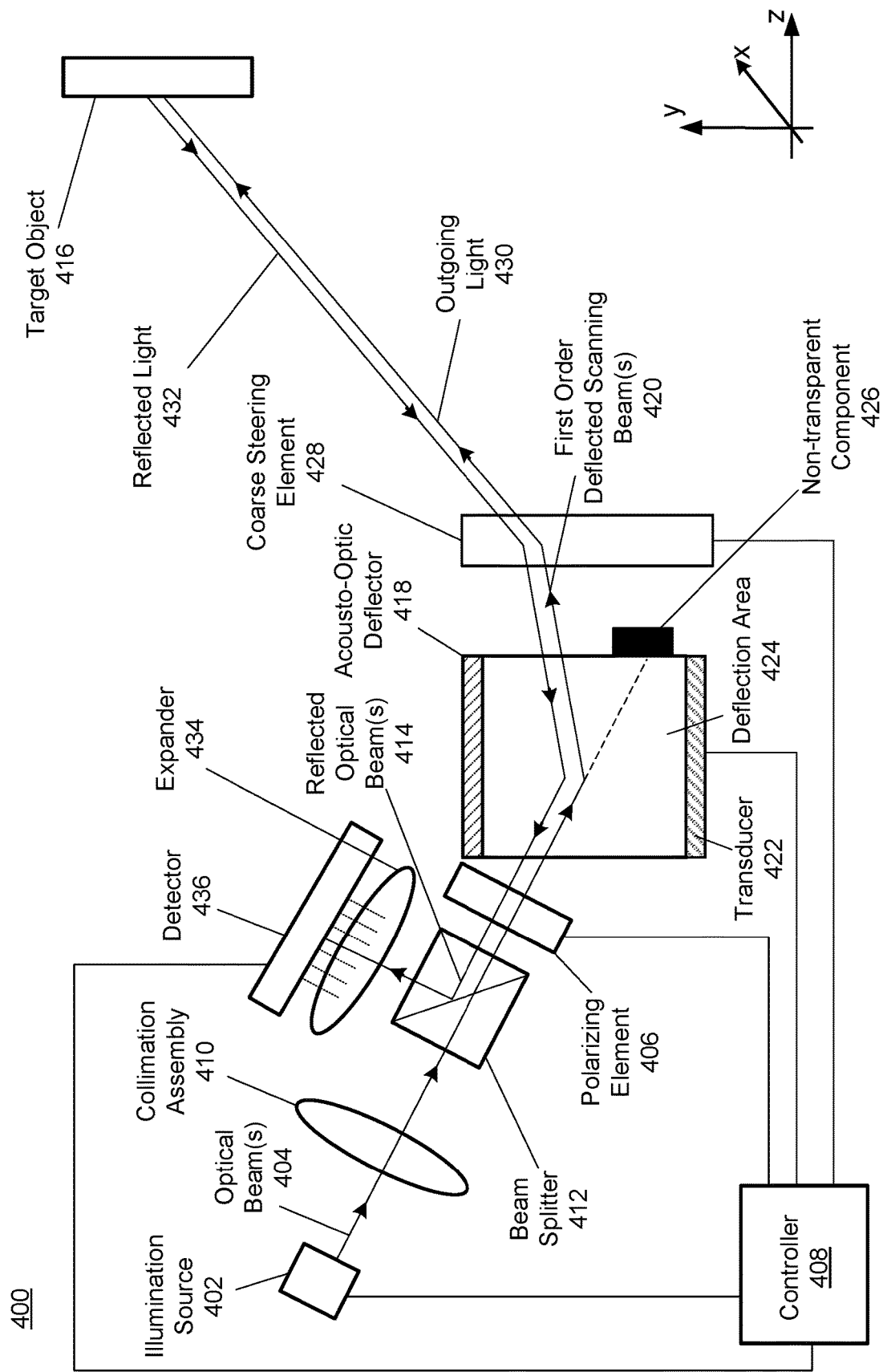
FIG. 4A is a beam steering assembly having a common transmit/receive channel, in accordance with an embodiment.

FIG. 4A is an example beam steering assembly 400 having a common transmit/receive channel, in accordance with an embodiment. Having the common transmit/receive channel reduces a part count of the beam steering assembly 400. In some embodiments, common components operating with both transmitted light and reflected light are tilted in order to reduce back scattering. Stray light effects of the common transmit/receive channel can further be reduced via time gating of the transmitted light. The beam steering assembly 400 in FIG. 4A is reversible, i.e., a transmit path tracing the transmitted light couples in the reflected light having a specific right angular sub-tense. The beam steering assembly 400 may be an embodiment of the beam steering assembly 300 in FIG. 3A. The beam steering assembly 400 may be part of the DCA 240 in FIG. 2.

The beam steering assembly 400 includes an illumination source 402 (e.g., laser diode) configured to emit one or more optical beams 404. In some embodiments, the illumination source 402 is pulsed with a high peak power and a narrow pulse width, e.g., based in part on the emission instructions from the controller 408. The illumination source 402 when being pulsed may generate the one or more optical beams 404 at each time instant of a plurality of time instants. In some embodiments, the illumination source 402 generates the optical beams 404 over, e.g., tens, hundreds or thousands of time instants for each depth sensing measurement of a local area surrounding some or all of the beam steering assembly 400. A rate of generating the optical beams 404 over the plurality of time instants may be related to a frequency of a pulse signal (e.g., controlled by the controller 408) that determines time instants when the illumination source 402 is pulsed to emit the one or more optical beams 404. In some embodiments, the illumination source 402 emits, at each time instant of the plurality of time instants, the one or more optical beams 404 as light of a certain chromatic component. The flexibility of the beam steering assembly 400 in emitting different chromatic components facilitate adjusting a beam steering angle when scanning a local area surrounding some or all of the beam steering assembly 400.

The illumination source 402 may directly generate the one or more optical beams 404 as polarized light. The one or more optical beams 404 can be circularly polarized (right handed or in other embodiments left handed). In alternate embodiments, the one or more optical beams 404 can be linearly polarized (vertical and horizontal), or elliptically polarized (right or left). Alternatively, the illumination source 402 may emit unpolarized light. In this case, a polarizing element 406 may generate polarized light, based in part on the emission instructions from the controller 408.

The polarizing element 406 can be a linear polarizer, a circular polarizer, an elliptical polarizer, etc. The polarizing element 406 can be implemented as a thin film polarizer (absorptive, reflective), a quarter wave plate combined with a linear polarizer, etc. In one embodiment, for converting linearly polarized light to circularly polarized light, the polarizing element 406 is implemented as a quarter wave plate. In an alternate embodiment, when the polarizing element 406 receives unpolarized light and converts the unpolarized light to circularly polarized light, the polarizing element 406 includes a linear polarizer and a quarter wave plate.

A collimation assembly 410 collects light from the illumination source 402 and directs it towards a beam splitter 412 and the polarizing element 406. The collimation assembly 410 is composed of one or more optical elements (lenses). The beam splitter 412 splits the one or optical beams 404 emitted from the illumination source 402 and one or more optical beams 414 reflected from one or more target objects 416 in a local area surrounding some or all of the beam steering assembly 400. In one embodiment, the polarizing element 406 generates polarized light from the unpolarized one or more optical beams 404. In another embodiment, the polarizing element 406 changes polarization of the polarized one or more optical beams 404, e.g., from s-polarized light to left handed circularly polarized light.

As shown in FIG. 4A, the polarized one or more optical beams 404 are coupled into a fine steering element implemented based on a single acousto-optic deflector 418. The acousto-optic deflector 418 deflects the one or more optical beams 404 into one dimension (e.g., x dimension) to generate one or more first order deflected scanning beams 420. Alternatively, the fine steering element 305 is composed of a pair of acousto-optic devices (not shown in FIG. 4A) whose axes of orientation are orthogonal to each other. Accordingly, one acousto-optic device deflects light in one dimension (e.g., x) and the second acousto-optic device deflects the x-deflected light along an orthogonal dimension (e.g., y), thereby generating the first order deflected scanning beams 420 as two-dimensional scanning beams for two-dimensional random scanning.

In some embodiments, the acousto-optic deflector 418 functions as a dynamic deflection grating that deflects the one or more optical beams 404 to form the one or more first order deflected scanning beams 420 based in part on the emission instructions from the controller 408. The acousto-optic deflector 418 may include a transducer 422 and a deflection area 424. Responsive to a radio frequency in the emission instructions, the transducer 422 of the acousto-optic deflector 418 may be configured to generate a sound wave in the deflection area 424 to form the dynamic diffraction grating. In some embodiments, the acousto-optic deflector 418 has a small angular region where the acousto-optic deflector 418 remains efficient for receiving light reflected from the one or more target objects 416. As shown in FIG. 4A, the acousto-optic deflector 418 may include a non-transparent component 426 that blocks zero-order beam(s) generated by the acousto-optic deflector 418 from interfering with the one or more first order deflected scanning beams 420. A location of the non-transparent component 426 on the acousto-optic deflector 418 may be selected based on a design decision about which incident angle to the acousto-optic deflector 418 of the one or more optical beams 404 provides a preferred deflection efficiency.

The one or more first order deflected scanning beams 420 generated by the fine steering element based on the acousto-optic deflector 418 can be scanned at, e.g., MHz speed. The one or more first order deflected scanning beams 420 having a fast scanning speed are then propagated to a coarse steering element 428 positioned in front of the acousto-optic deflector 418 for expanding a field-of-view and achieving dynamic illumination. In some embodiments, the one or more first order deflected scanning beams 420 have same polarization as the one or more optical beams 404, i.e., the one or more first order deflected scanning beams 420 are left handed circularly polarized.

The coarse steering element 428 deflects the one or more first order scanning beams 420 at a specific deflection angle to generate outgoing (transmitted) light 430 having a wide angular spread. In some embodiments, the outgoing light 430 is composed of one or more light beams. In alternate embodiments, the outgoing light 430 is structured light of a defined pattern, e.g. a line pattern or a dot pattern. In some embodiments, the specific deflection angle of the coarse steering element 428 is controlled based in part on the emission instructions from the controller 408. The coarse steering element 428 expands scanning angles of the one or more first order scanning beams 420 to achieve a wide field-of-view for scanning the one or more target objects 416 in the local area. Thus, the coarse steering element 428 generates, by deflecting the one or more first order deflected scanning beams 420, the outgoing light 430 covering a large scanning field. In some embodiments, polarization of the outgoing light 430 is same as polarization of the one or more first order deflected scanning beams 420, i.e., the outgoing light 430 is left handed circularly polarized light. In one embodiment, the coarse steering element 428 is designed based on a scanning assembly shown in FIG. 3C. In another embodiment, the coarse steering element 428 is designed as a liquid lens deflector shown in FIG. 3D. In yet another embodiment, the coarse steering element 428 is implemented as the polarization grating stack 350 shown in FIG. 3E. In yet another embodiment, the coarse steering element 428 is implemented as the polarization grating stack 360 shown in FIG. 3F.

The coarse steering element 428 may also include a projection assembly (not shown in FIG. 4A) that projects the outgoing light 430 to illuminate the one or more target objects 416 in the local area. Reflected light 432 is generated based on reflection of the outgoing light 430 from the one or more target objects 416. In some embodiments, the reflected light 432 is composed of one or more light beams. In alternate embodiments, the reflected light 432 is structured light of a pattern related to that of the outgoing light 430 distorted by shapes of the one or more target objects 416. In some embodiments, when the outgoing light 430 is circularly polarized of a first handedness, the reflected light 432 is circularly polarized of a second handedness orthogonal to the first handedness. For example, when the outgoing light 430 is left handed circularly polarized, the reflected light 432 is right handed circularly polarized.

Having the outgoing light 430 polarized (e.g., left handed circularly polarized) and having the reflected light 432 polarized (e.g., right handed circularly polarized) offers a potential advantage in terms of a signal-to-noise ratio (SNR) relative to background ambient illumination. The target object 416 illuminated with the circularly polarized outgoing light 430 tend to reflect the light 432 that is also circularly polarized (just of an orthogonal handedness). As the circular polarization of the reflected light 432 can be reverse traced through the receive channel of the beam steering assembly 400, energy of the randomly polarized (i.e., unpolarized) background ambient light can be reduced, e.g., by a factor of two. Additional details regarding circularly polarized illumination and detection for depth sensing are described with regard to U.S. application Ser. No. 15/636,398, filed on Jun. 28, 2017, which is incorporated by reference in its entirety.

As shown in FIG. 4A, the beam steering assembly 400 includes a common transmit/receive channel. An interference between transmitted and received (reflected) light at common components of the beam steering assembly 400 is low because of different (e.g., orthogonal) polarization of the transmitted and received light. The light 432 reflected from the one or more target objects 416 is deflected, at a first deflection angle, by the coarse steering element 428 toward the acousto-optic deflector 418. The acousto-optic deflector 418 further deflects, e.g., at a second deflection angle smaller than the first deflection angle, the reflected light 432 toward the polarizing element 406. The first and second deflection angles may be controlled based on receiving instructions from the controller 408. In some embodiments, the polarizing element 406 changes polarization of the reflected light 432 to generate the one or more reflected optical beams 414 of a specific polarization, e.g., from right handed circular polarization to p-polarization. The beam splitter 412 splits the one or more reflected optical beams 414 from the one or more optical beams 404 emitted from the illumination source, and directs the one or more reflected optical beams 414 toward an expander 434 and a detector 436 (camera). In some embodiments, another non-transparent component (not shown in FIG. 4A) similar to the non-transparent component 426 is included on a side of the acousto-optic deflector 418 opposite to a side where the non-transparent component 426 is located. The other non-transparent component is coupled to the acousto-optic deflector 418 to block portions of the reflected light 432 not being deflected by the acousto-optic deflector 418 from reaching the detector 436.

The expander 434 is positioned in front of the detector 436, and may include one or more optical elements (e.g., lenses). The expander 434 is configured to receive portions of the reflected light 432 (i.e., the one or more reflected optical beams 414) and to expand the one or more reflected optical beams 414 into a light pattern suitable for detection by the detector 436. The detector 436 captures one or more images of the one or more target objects 416 by capturing the one or more reflected optical beams 414. In some embodiments, the detector 436 is an infrared camera configured to capture images in the infrared expanded to include a band of the illumination source 402. The detector 436 can be configured to operate with a frame rate in the range of kHz to MHz for fast detection of the target objects 416. In some embodiments, the expander 434 is integrated with the detector 436. In alternate embodiments, the expander 434 is internal to the detector 436. In some embodiments, a filter (not shown in FIG. 4A) is positioned in front of the detector 436 to reduce noise.

The detector 436 may include a plurality of photodiodes or pixels. Alternatively, the detector 436 may be implemented as a single pixel detector. For depth sensing based on time-of-flight, the detector 436 captures light signals related to the reflected optical beams 414 over a defined amount of time. It should be understood that a light signal captured by each pixel of the detector 436 can refer to a detection event or to a measured intensity related to a reflected optical beam 414 incident on the pixel of the detector 436. For example, the detection event can refer to the detection of a single photon arrival event via a pulse of current that is typically digitized inside the pixel of the detector 436. In some embodiments, the detector 436 is implemented as a dense array of SPAD pixels arranged in a two-dimensional array. In alternate embodiments, the detector 436 is conceptually implemented as a single pixel detector, e.g., a SiPM. The single-pixel detector 436 implemented as a SiPM may include an analog output that is analyzed by signal discriminators and time-to-digital converters (not shown in FIG. 4A). The SiPM-based detector 436 may be fabricated by creating a dense SPAD array where outputs of all SPADs are summed together to generate an analog output pulse. For the SiPM-based detector 436, it may be preferred to spread an optical intensity of the reflected optical beams 414 to be as uniform as possible across a surface of the detector 436. The detector 436 may be also implemented as an avalanche photodiode (APD) single pixel detector. Alternatively, the detector 436 may comprise a single photodiode. In some other embodiments, the detector 436 may be implemented as a graphene dot photocurrent detector or as a graphene/quantum dot photocurrent detector.

For depth sensing based on time-of-flight, the detector 436 captures the one or more images of the one or more target objects 416 by capturing charges in storage bins associated with each pixel in the detector 436 over a defined amount of time. The detector 436 may store a charge in each storage bin associated with an intensity of one reflected optical beam 414 for a particular time instant. In some embodiments, the detector 436 captures charges associated with intensities of the reflected optical beams 414 over a plurality of time instants in order to accumulate an appropriate level of SNR for each depth sensing measurement of the one or more target objects. For example, the detector 436 may capture the charges over tens, hundreds, or thousands of time instants for each depth sensing measurement.

In some other embodiments, for depth sensing based on structured light illumination, the reflected optical beams 414 form structured light of, e.g., line pattern or dot pattern. The detector 436 may capture phase-shifted patterns of the reflected optical beams 414 distorted by shapes of the one or more target objects 416 relative to a structured pattern of the outgoing light 430. The detector 436 provides information about the phase-shifted patterns to the controller 408 for depth sensing of the local area.

Note that the one or more reflected optical beams 414 and the outgoing light 430 are associated with same angular locations of the local area surrounding the beam steering assembly 400. Because of that, a field-of-view of the receive channel in the beam steering assembly 400 can be limited. However, having the detector 436 and the illumination source 402 looking at the same direction offers a number of advantages. A small field-of-view of the receive channel may reduce an amount of background ambient light collected by the detector 436. This can improve sensitivity of the detector 436, lessen power requirements of the illumination source 402, and/or increase a range of the beam steering assembly 400. Thus, components of the beam steering assembly 400 can be made more compact. Because of a small field-of-view requirement for the detector 436, the detector 436 can be implemented as an array of a few small high-sensitivity pixels, as a SPAD, or as a quantum imaging sensor. A field-of-view of the detector 436 may be matched to a divergence angle of the reflected light 432. In the illustrative embodiment of FIG. 4A where the fine steering element 305 in FIG. 3A is based on the acousto-optic deflector 418, the acousto-optic deflector 418 may limit the field-of-view of the detector 436, which relaxes imaging requirements for the detector 436. Resolution of images captured by the detector 436 can be very high even if traditional sensors are employed within the detector 436. In some embodiments, as discussed, the detector 436 can be implemented as a high sensitivity single pixel detector because a direction of the one or more outgoing optical beams 404 and a point angle of the received one or more reflected optical beams 414 are certain. Thus, the detector 436 may be implemented as a SiPM, a SPAD, an avalanche photodiode, a quanta imaging sensor, etc. In some embodiments, the detector 436 can be implemented to have fast response times suitable for depth sensing based on time-of-flight.

The controller 408 is configured to control operations of various components of the beam steering assembly 400 in FIG. 4A. In some embodiments, the controller 408 provides emission instructions to the illumination source 402 to control intensity of the one or more optical beams 404, modulation of the one or more optical beams 404, a time duration during which the illumination source 402 is activated, etc. The controller 408 may further create the emission instructions which include a radio frequency at which the acousto-optic deflector 418 is driven. The controller 408 may generate the emission instructions based on, e.g., a predetermined list of values for the radio frequency stored in a look-up table of the controller 408. In an embodiment, the predetermined radio frequencies are stored as waveforms in an electronic chip, e.g., in a direct digital synthesizer (not shown in FIG. 4A) coupled to the controller 408. In another embodiment, the emission instructions are created by a voice control integrated into the controller 408. Upon a verbal request, the voice control of the controller 408 computes a radio frequency for driving the acousto-optic deflector 418 to generate the one or more first order deflected scanning beams 420 and the outgoing light 430 of a specific spatial frequency suitable for detection of stationary object(s) 416 and/or tracking of moving object(s) 416.

The controller 408 can modify the radio frequency at which the acousto-optic deflector 418 is driven to adjust a deflection angle at which the one or more optical beams 404 are deflected. In this way, the controller 408 can instruct the acousto-optic deflector 418 to scan a plurality of deflection angles at which the one or more optical beams 404 are deflected and interfered to form the one or more first order deflected scanning beams 420 and the outgoing light 430. In some embodiments, a radio frequency at which the acousto-optic deflector 418 is driven controls a separation of the optical beams 404 deflected by the acousto-optic deflector 418. Hence, a spatial frequency of the resulting first order deflected scanning beams 420 (and of the outgoing light 430) directly depends on the radio frequency at which the acousto-optic deflector 418 is driven.

In some embodiments, the controller 408 provides the emission instructions to the coarse steering element 428 for controlling a deflection angle of the coarse steering element 428 and an angular spread of the generated outgoing light 430. The controller 408 may also control, based in part on receiving instructions, operations of the acousto-optic deflector 418 and/or the coarse steering element 428 for deflecting the reflected light 432 along a receive path of the beam steering assembly 400. The controller 408 may generate the receiving instructions based on, e.g., a predetermined list of values for the radio frequency stored in a look-up table of the controller 408. In an embodiment, the predetermined radio frequencies are stored as waveforms in an electronic chip, e.g., in a direct digital synthesizer (not shown in FIG. 4A) coupled to the controller 408. In another embodiment, the receiving instructions are created by a voice control integrated into the controller 408. Upon a verbal request, the voice control of the controller 408 computes a radio frequency for driving the acousto-optic deflector 418 to generate the one or more reflected optical beams 414.

As shown in FIG. 4A, the controller 408 is further coupled to the detector 436 and can be configured to determine depth information for the one or more target objects 416 in the local area. The controller 408 is configured to determine depth information for the one or more target objects 416 based at least in part on the captured reflected optical beam(s) 414. In some embodiments, the controller 408 can be configured to determine the depth information based on polarization information of the captured reflected optical beam(s) 414. The controller 408 may be configured to estimate different materials (e.g., different types of metal, fabric, etc.) of the one or more target objects 416 based in part on the polarization information of the captured reflected optical beam(s) 414. In this case, the detector 436 coupled to the controller 408 can operate as a time-of-flight polarimeter configured to capture temporal pulses associated with the reflected optical beams 414 captured by the detector 436. Additional details regarding detection of different materials based on polarization information are described with regard to U.S. application Ser. No. 15/636,398, filed on Jun. 28, 2017, and U.S. application Ser. No. 15/428,780, filed on Feb. 9, 2017, which are incorporated by reference in their entirety.

In some embodiments, for depth sensing based on time-of-flight, the controller 408 determines the depth information based on a ratio of charges stored in storage bins associated with each pixel in the detector 436 accumulated over a plurality of time instants. For depth-sensing based on time-of-flight, the detector 436 can be implemented as a "single pixel" detector, e.g., a photo-diode or an APD. Alternatively, the detector 436 can be implemented as a "single super-pixel" detector, e.g., a dense array of SPAD pixels where outputs of all SPAD pixels are summed to generate an analog output. As a rising edge of the reflected optical beam 414 is incident on the detector 436, an increasing amount of photocurrent is generated in the analog pixel output. This signal is then provided to edge detection circuitry, e.g., a level threshold comparator or a constant fraction discriminator, for conversion into a digital timestamp signal. If an SNR value of the single digital timestamp signal is higher than a threshold value, the controller 408 may utilize the single digital timestamp signal to determine the depth information for the target object 416. Otherwise, measurements of the reflected optical beam 414 incident on the detector 436 are aggregated over, e.g., tens, hundreds or thousands of repeated processes. Then, an aggregated digital signal of the detector 436 is generated based on aggregation and digital conversion of the analog pixel output of the detector 436 over a plurality of timestamps. The measurements are repeated until an SNR of the aggregated digital signal exceeds the threshold value, i.e., until the aggregated digital signal is differentiated from background noise. The controller 408 may then determine the depth information for the target object 418 based on the aggregated digital signal. In some embodiments, the detector 436 can be implemented as a SPAD array, where each pixel performs a separate time-to-digital conversion measurement on chip or off chip. Then, the controller 408 may determine the depth information for the target object 418 based on digital timestamp signals collected from a plurality of pixels in the SPAD array over one or more time instants. In alternate embodiments, for depth sensing based on structured light illumination, the controller 408 uses triangulation calculation to obtain a depth map of the local area based on phase-shifted patterns of the reflected optical beams 414 distorted by shapes of the one or more objects in the local area.

Figure 4B:
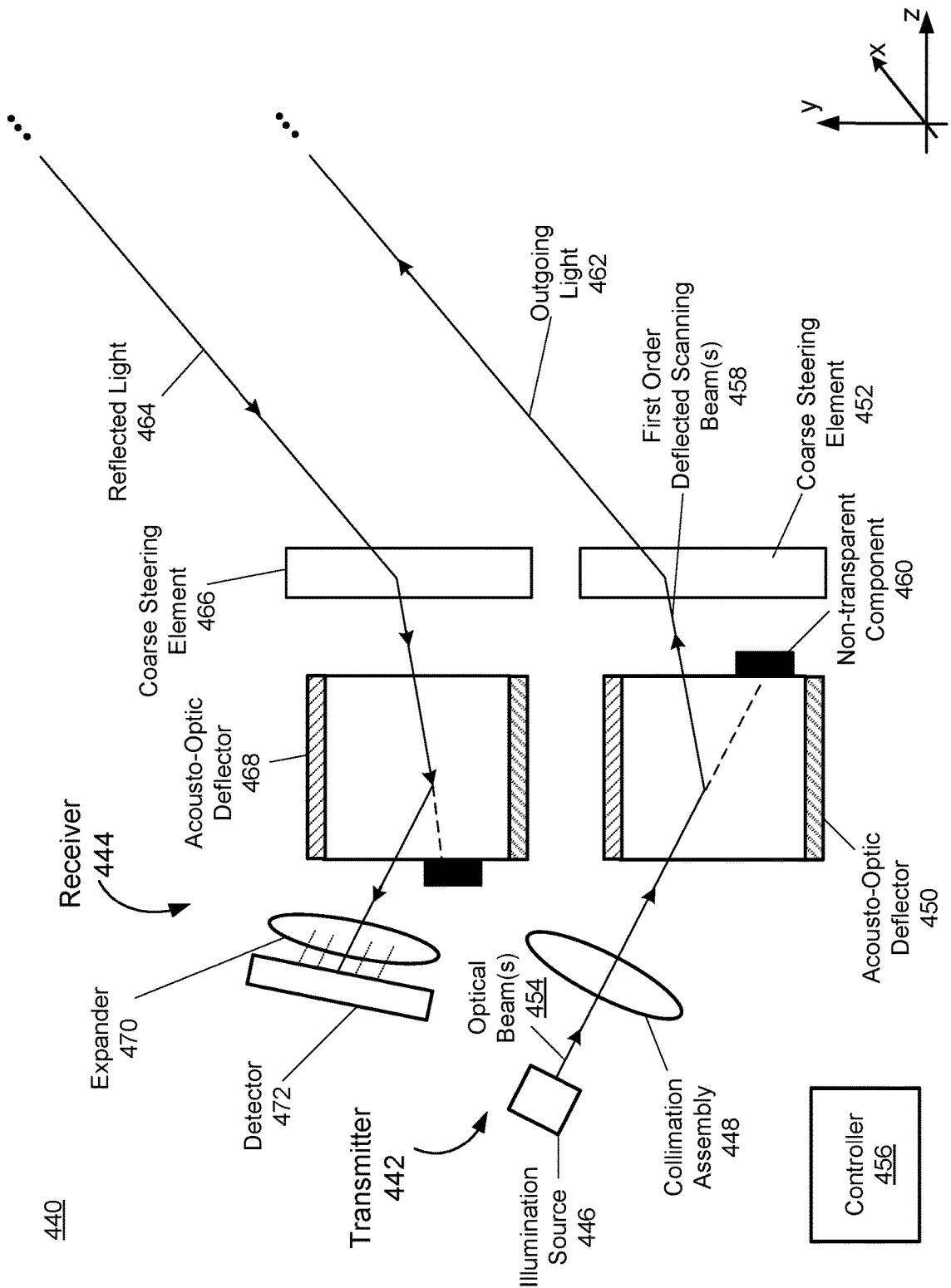
FIG. 4B is a beam steering assembly having separate transmit and receive channels, in accordance with an embodiment.

FIG. 4B illustrates a beam steering assembly 440 having separate transmit and receive channels, in accordance with an embodiment. The beam steering assembly 440 includes a transmitter 442 separate from a receiver 444. The transmitter 442 includes an illumination source 446 (e.g., laser diode), a collimation assembly 448, a fine steering element based on a single acousto-optic deflector 450, and a coarse steering element 452. In some embodiments (not shown in FIG. 4B), instead of the single acousto-optic deflector 450, the fine steering element incudes a pair of acousto-optic devices whose axes of orientation are orthogonal to each other. In one embodiment, the coarse steering element 452 is implemented based on scanning lenses (e.g., as shown in FIG. 3C). In another embodiment, the coarse steering element 452 is implemented as a liquid lens deflector (e.g., as shown in FIG. 3D). In yet another embodiment, the coarse steering element 452 is implemented based on a polarization grating stack (e.g., as shown in FIGS. 3E-3F).

Components of the transmitter 442 operates in the same manner as the corresponding components of the transmit path of the beam steering assembly 400 in FIG. 4A. One notable difference is that illumination light generated by the transmitter 442 does not need to be polarized as transmit and receive channels are fully separated in the beam steering assembly 440. Thus, the illumination source 446 may emit one or more optical beams 454 as unpolarized light. In alternate embodiments, the one or more optical beams 454 can be circularly polarized (right or left), linearly polarized (vertical or horizontal), or elliptically polarized (right or left), e.g., based on emission instructions from a controller 456.

The one or more optical beams 454 after being collimated by the collimation assembly 448 are deflected by the acousto-optic deflector 450. The acousto-optic deflector 450 is operated based on the emission instructions from the controller 456, in the same manner as the acousto-optic deflector 418 of the beam steering assembly 400 in FIG. 4A. By deflecting the one or more optical beams 454, the acousto-optic deflector 450 generates one or more first order deflected scanning beams 458. As shown in FIG. 4B, the acousto-optic deflector 450 includes a non-transparent component 460 that blocks zero-order beam(s) generated by the acousto-optic deflector 450 and prevents interference with the one or more first order deflected scanning beams 458. The coarse steering element 452 further deflects (e.g., based in part on the emission instructions from the controller 456) the one or more first order deflected scanning beams 458 to generate outgoing light 462 having a wide field-of-view for scanning one or more target objects (not shown in FIG. 4B).

Light 464 reflected from the one or more target objects is received by the receiver 444. Components of the receiver 444 operate in the same manner as the corresponding components in the receive path of the beam steering assembly 400 in FIG. 4A. The light 464 reflected from the one or more target objects is deflected, at a first deflection angle, by another coarse steering element 466 toward another acousto-optic deflector 468 (another fine steering element). The acousto-optic deflector 468 further deflects, e.g., at a second deflection angle smaller than the first deflection angle, the reflected light 464 toward an expander 470 and a detector 472 (camera). The first and second deflection angles may be controlled based on receiving instructions from the controller 456. In some embodiments, the detector 472 can be implemented and operated in the same manner as the detector 436 of the beam steering assembly 400 in FIG. 4A. The detector 472 captures one or more images of the one or more target objects by capturing portions of the reflected light 464.

The controller 456 is configured to control operations of various components of the beam steering assembly 440 in FIG. 4B, in the similar manner as the controller 408 of the beam steering assembly 400 in FIG. 4A. The controller 456 controls operations of some or all of components of the transmitter 442 and the receiver 444. Furthermore, the controller 456 may be configured to determine depth information for the one or more target objects based on the portions of the reflected light 464 captured by the detector 472.

Combining dynamic steering with matching the receive channel field-of-view achieved for the beam steering assemblies 400 and 440 in FIGS. 4A-4B removes the difficult tradeoff between a field-of-view and resolution. The beam steering assemblies 400 and 440 in FIGS. 4A-4B can quickly step over a wide angular range and determine detailed features of scanned objects at a later time. This allows the tradeoff between the field-of-view and resolution to be moved to the time domain where important large scale features are built up first with the detailed features coming next.

In some embodiments (not shown in FIG. 4B), the receiver 444 does not include the acousto-optic deflector 468, but some other fine steering element different from the acousto-optic deflector 468. The receiver 444 is then configured to capture one or more images of a local area including portions of the reflected light 464 in accordance with receiving instructions. The portions of the reflected light 464 captured by the receiver 444 are reflected from one or more objects in the local area. In some embodiments, the receiver 444 includes a polarizing element for receiving the portions of the reflected light 464 having a specific polarization and propagating the polarized reflected light 464. In some embodiments, the portions of the reflected light 464 include circularly polarized light, e.g., of a handedness orthogonal to a handedness of the outgoing light 462.

Figure 5:
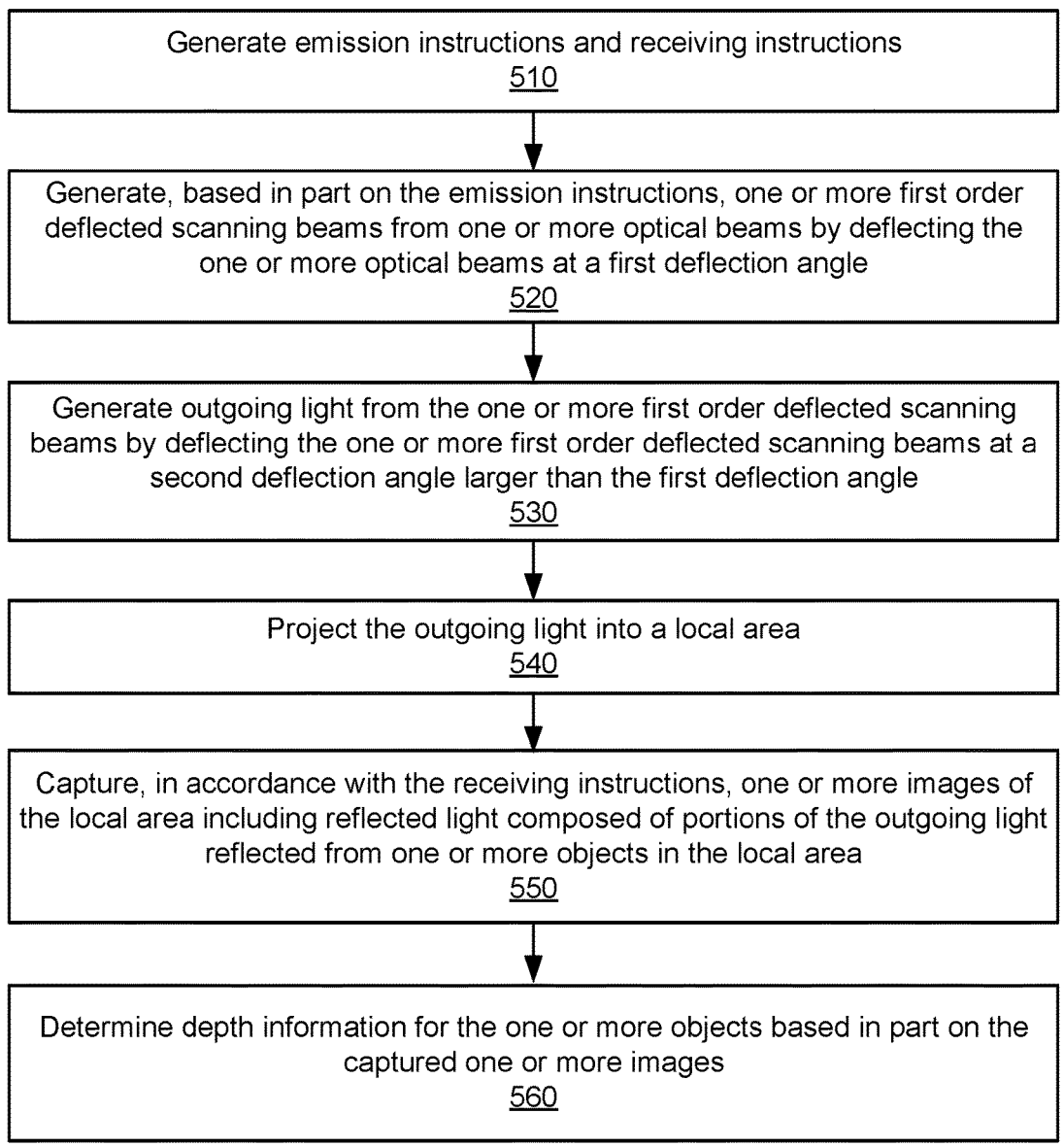
FIG. 5 is a flow chart illustrating a process of depth sensing, in accordance with an embodiment.

FIG. 5 is a flow chart illustrating a process 500 of determining depth information of objects in a local area, which may be implemented at the HMD 100 shown in FIG. 1, in accordance with an embodiment. The process 500 of FIG. 5 may be performed by the components of a DCA (e.g., the DCA 240), a beam steering assembly (e.g., the beam steering assembly 400, the beam steering assembly 440), or some combination thereof. Other entities (e.g., a HMD and/or console) may perform some or all of the steps of the process in other embodiments. Likewise, embodiments may include different and/or additional steps, or perform the steps in different orders.

The DCA generates 510 (e.g., via a controller) emission instructions and receiving instructions. The DCA may generate the emission instructions and the receiving instruction which include a radio frequency at which a dynamic diffraction grating of the DCA is driven. The DCA may generate the emission instructions and the receiving instructions based on, e.g., a predetermined list of values for the radio frequency stored in a look-up table of the DCA. In an embodiment, the predetermined radio frequencies are stored as waveforms in an electronic chip, e.g., in a direct digital synthesizer. In another embodiment, the emission instructions and the receiving instructions are created by a voice control integrated into the DCA. The DCA may provide the emission instructions to an illumination source, a fine steering element, and, optionally, a coarse steering element within a transmitter of the DCA. Based on the emission instructions, the illumination source may emit one or more optical beams. Based on the emission instructions, the fine steering element may deflect the one or more optical beams. Responsive to the radio frequency in the emission instructions, the DCA generates a sound wave within the fine steering element to form the dynamic diffraction grating for diffraction of the one or more optical beams. The DCA may provide the receiving instructions to one or more components of a receiver within the DCA to receive light reflected from the local area.

The DCA generates 520 (via a fine steering element), based in part on the emission instructions, one or more first order deflected scanning beams from the one or more optical beams by deflecting the one or more optical beams at a first deflection angle to form the one or more first order deflected scanning beams. In some embodiments, the fine steering element functions as one or more dynamic diffraction gratings. In some embodiments, the DCA modifies the radio frequency in the emission instructions to adjust the first deflection angle at which the one or more optical beams are deflected and interfered to form the one or more first order deflected scanning beams. In some embodiments, the one or more first order deflected scanning beams represent polarized light.

The DCA generates 530 (e.g., via a coarse steering element) outgoing light from the one or more first order deflected scanning beams by deflecting the one or more first order deflected scanning beams at a second deflection angle larger than the first deflection angle to form the outgoing light. In some embodiments, the outgoing light is composed of one or more outgoing light beams. In alternate embodiments, the outgoing light is structured light of a defined pattern, e.g., line pattern or dot pattern. In the illustrative embodiment, the first deflection angle can be between −5 degrees and +5 degrees along both horizontal and vertical dimensions. The second deflection angle can be, for example, between −30 degrees and +30 degrees along both horizontal and vertical dimensions. In some embodiments, the coarse steering element can steer the outgoing light to particular portions of the local area. In some embodiments, the coarse steering element can be implemented based on scanning lenses, as a liquid lens deflector, or based on polarization grating stacks. In some embodiments, the outgoing light is generated as polarized light having a circular polarization. A large angular spread achieved by the coarse steering element provides a large field-of-view for scanning of the local area.

The DCA projects 540 (e.g., via a projection assembly) the outgoing light into a local area. In some embodiments, the outgoing light is light that is circularly polarized at a first handedness. In some embodiments, the DCA projects 540 the outgoing light to illuminate a wide field-of-view of the local area for accurate depth sensing of the local area. The DCA may also control (e.g., via a controller) a size of the illuminated portion of the local area by controlling the dynamic diffraction grating within the DCA, the first deflection angle, and the second deflection angle.

The DCA captures 550 (e.g., via a receiver), in accordance with the receiving instructions, one or more images of the local area including reflected light composed of portions of the outgoing light reflected from the one or more objects in the local area. In some embodiments, the receiver includes a polarizing element for receiving the reflected light having a specific polarization and propagating the polarized reflected light to a detector (camera) of the receiver. In some embodiment, the reflected light is circularly polarized at a second handedness orthogonal to the first handedness of the outgoing light.

The DCA determines 560 (e.g., via a controller) depth information for the one or more objects based in part on the captured one or more images. In some embodiments, for depth sensing based on time-of-flight, the DCA determines the depth information using a ratio of charges stored in storage bins associated with each pixel in a detector within the receiver. In this case, the detector can be configured to store charge in each storage bin associated with an intensity of the reflected light for a particular amount of time. In alternate embodiments, for depth sensing based on structured light illumination, the DCA captures phase-shifted patterns of the reflected light distorted by shapes of the one or more objects in the local area, and uses triangulation calculation to obtain a depth map of the local area. The DCA may enhance depth resolution of the local area based on, e.g., information about polarization of the captured reflected light.

In some embodiments, the DCA generates (e.g., via another coarse steering element) one or more first order deflected reflecting beams from the portions of the reflected light by deflecting the portions of the reflected light at a third deflection angle to form the one or more first order deflected reflecting beams. In some embodiments, the coarse steering element and the other coarse steering element represent a single component common for the transmitter and the receiver of the DCA.

In some embodiments, the DCA generates (e.g., via another fine steering element), based in part on the receiving instructions, one or more second order deflected reflecting beams by deflecting the one or more first order deflected reflecting beams at a fourth deflection angle smaller than the third deflection angle to form the one or more second order deflected reflecting beams. In some embodiments, the fine steering element and the other fine steering element represent a single component common for the transmitter and the receiver of the DCA. In some embodiments, the other fine steering element functions as one or more dynamic diffraction gratings. In some embodiments, the DCA modifies a radio frequency in the receiving instructions to adjust the third deflection angle at which the one or more first order deflected reflecting beams are deflected and interfered to form the one or more second order deflected reflecting beams. In some embodiments, the DCA captures (e.g., via the detector) the one or more images by capturing the one or more second order deflected reflecting beams.

In some embodiments, the DCA is configured as part of a HMD, e.g., the HMD 100 in FIG. 1. In one embodiment, the DCA provides the determined depth information to a console coupled to the HMD. The console is then configured to generate content for presentation on an electronic display of the HMD, based on the depth information. In another embodiment, the DCA provides the determined depth information to a module of the HMD that generates content for presentation on the electronic display of the HMD, based on the depth information. In an alternate embodiment, the DCA is integrated into a HMD as part of an AR system. In this case, the DCA may be configured to sense and display objects behind a head of a user wearing the HMD or display objects recorded previously.

System Environment

Figure 6:
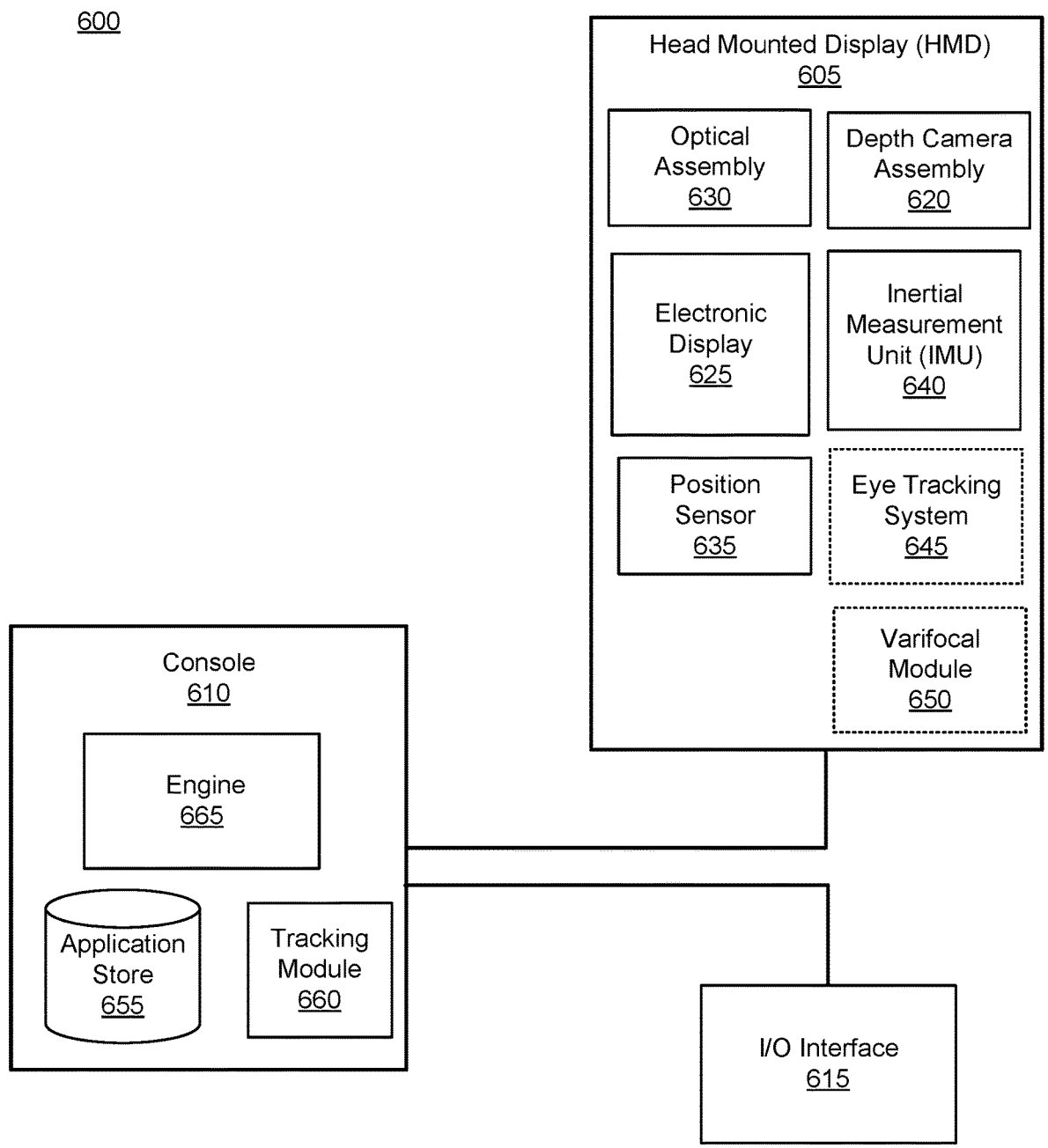
FIG. 6 is a block diagram of a HMD system in which a console operates, in accordance with an embodiment.

FIG. 6 is a block diagram of one embodiment of a HMD system 600 in which a console 610 operates. The HMD system 600 may operate in a VR system environment, an AR system environment, a MR system environment, or some combination thereof. The HMD system 600 shown by FIG. 6 comprises a HMD 605 and an input/output (I/O) interface 615 that is coupled to the console 610. While FIG. 6 shows an example HMD system 600 including one HMD 605 and on I/O interface 615, in other embodiments any number of these components may be included in the HMD system 600. For example, there may be multiple HMDs 605 each having an associated I/O interface 615, with each HMD 605 and I/O interface 615 communicating with the console 610. In alternative configurations, different and/or additional components may be included in the HMD system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the HMD 605.

The HMD 605 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 605, the console 610, or both, and presents audio data based on the audio information. The HMD 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 605 is the HMD 100 described above in conjunction with FIG. 1.

The HMD 605 includes a DCA 620, an electronic display 625, an optical assembly 630, one or more position sensors 635, an IMU 640, an optional eye tracking system 645, and an optional varifocal module 650. Some embodiments of the HMD 605 have different components than those described in conjunction with FIG. 6. Additionally, the functionality provided by various components described in conjunction with FIG. 6 may be differently distributed among the components of the HMD 605 in other embodiments.

The DCA 620 captures data describing depth information of a local area surrounding some or all of the HMD 605. The DCA 620 can compute the depth information using the data (e.g., based on captured portions of polarized light), or the DCA 620 can send this information to another device such as the console 610 that can determine the depth information using the data from the DCA 620.

The DCA 620 includes a beam steering assembly having a transmitter, a receiver, and a controller. The transmitter of the DCA 620 is configured to illuminate the local area with outgoing light in accordance with emission instructions. The transmitter of the DCA 620 comprises an illumination source, a fine steering element, a coarse steering element, and a projection assembly. The illumination source is configured to emit one or more optical beams. In some embodiments, the illumination source directly generates the one or more optical beams as polarized light, e.g., based on a polarizing element integrated into the illumination source or placed in front of the illumination source. In alternate embodiments, the illumination source generates the one or more optical beams as unpolarized light. The fine steering element is configured to deflect, based in part on the emission instructions, the one or more optical beams at a first deflection angle to generate one or more first order deflected scanning beams. The one or more first order deflected scanning beams are coupled into the coarse steering element. The coarse steering element is configured to deflect the one or more first order deflected scanning beams at a second deflection angle larger than the first deflection angle to generate the outgoing light having a large angular spread. The coarse steering element may be based on, e.g., scanning lenses, a polarization grating stack, liquid crystal gratings, etc. In some embodiments, the coarse steering element deflects the one or more first order deflected scanning beams based in part on the emission instructions. The generated outgoing light having the large angular spread provides a wide field-of-view for scanning of the one or more objects in the local area. In some embodiments, the outgoing light is composed of one or more outgoing light beams. In alternate embodiments, the outgoing light is structured light of a defined pattern, e.g., a dot pattern or a line pattern. In some embodiments, the outgoing light is polarized light, e.g., circularly polarized light of a first handedness. The projection assembly is configured to project the outgoing light into the local area.

The receiver of the DCA 620 is configured to capture, in accordance with receiving instructions, one or more images of the local area including reflected light composed of portions of the outgoing light reflected from the one or more objects in the local area. In some embodiments, the receiver of the DCA 620 includes a polarizing element for receiving the reflected light having a specific polarization and propagating the polarized reflected light. In some embodiments, the polarizing element is common for both the transmitter and the receiver. In some embodiments, the reflected light includes circularly polarized light, e.g., of a second handedness orthogonal to the first handedness of the outgoing light.

In some embodiments, the receiver of the DCA 620 comprises another coarse steering element, another fine steering element and a detector. The fine steering element of the transmitter and the other fine steering element of the receiver may represent a single component common for the transmitter and the receiver. Similarly, the coarse steering element of the transmitter and the other coarse steering element of the receiver may represent another single component common for the transmitter and the receiver. The other coarse steering element is configured to deflect the reflected light at a third deflection angle to generate one or more first order deflected reflecting beams. The one or more first order deflected reflecting beams are coupled into the other fine steering element. The other fine steering element is configured to deflect, based in part on the receiving instructions, the one or more first order deflected reflecting beams at a fourth deflection angle smaller than the third deflection angle to generate one or more second order deflected reflecting beams. The detector is configured to capture the one or more images by capturing the one or more second order deflected reflecting beams.

The controller of the DCA 620 may be coupled to both the transmitter and the receiver. The controller of the DCA 620 generates the emission instructions and the receiving instructions. The controller of the DCA 620 provides the emission instructions to one or more components of the transmitter, e.g., the illumination source, the fine steering element, and/or the coarse steering element. The controller of the DCA 620 may provide the receiving instructions to one or more components of the receiver, e.g., the other fine steering element and/or the other coarse steering element. The controller of the DCA 620 is also configured to determine depth information for the one or more objects based in part on the captured one or more images. The DCA 620 is an embodiment of the DCA 240 in FIG. 2, the beam steering assembly 400 in FIG. 4A, or the beam steering assembly 440 in FIG. 4B.

The electronic display 625 displays 2D or 3D images to the user in accordance with data received from the console 610. In various embodiments, the electronic display 625 comprises a single electronic display or multiple electronic displays (e.g., a display for each eye of a user). Examples of the electronic display 625 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 630 magnifies image light received from the electronic display 625, corrects optical errors associated with the image light, and presents the corrected image light to a user of the HMD 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the electronic display 625 to be physically smaller, weigh less and consume less power than larger displays. Additionally, magnification may increase the field of view of the content presented by the electronic display 625. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 625 for display is predistorted, and the optical assembly 630 corrects the distortion when it receives image light from the electronic display 625 generated based on the content.

The IMU 640 is an electronic device that generates data indicating a position of the HMD 605 based on measurement signals received from one or more of the position sensors 635 and from depth information received from the DCA 620. A position sensor 635 generates one or more measurement signals in response to motion of the HMD 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the HMD 605 relative to an initial position of the HMD 605. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the HMD 605 from the sampled data. For example, the IMU 640 integrates the measurement signals received from the accelerometers over time to estimate a velocity vector and integrates the velocity vector over time to determine an estimated current position of a reference point on the HMD 605. Alternatively, the IMU 640 provides the sampled measurement signals to the console 610, which interprets the data to reduce error. The reference point is a point that may be used to describe the position of the HMD 605. The reference point may generally be defined as a point in space or a position related to the HMD's 605 orientation and position.

The IMU 640 receives one or more parameters from the console 610. The one or more parameters are used to maintain tracking of the HMD 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the HMD 605, the IMU 640 may be a dedicated hardware component. In other embodiments, the IMU 640 may be a software component implemented in one or more processors.

In some embodiments, the eye tracking system 645 is integrated into the HMD 605. The eye tracking system 645 determines eye tracking information associated with an eye of a user wearing the HMD 605. The eye tracking information determined by the eye tracking system 645 may comprise information about an orientation of the user's eye, i.e., information about an angle of an eye-gaze. In some embodiments, the eye tracking system 645 is integrated into the optical assembly 630. An embodiment of the eye-tracking system 645 may comprise an illumination source and an imaging device (camera).

In some embodiments, the varifocal module 650 is further integrated into the HMD 605. The varifocal module 650 may be coupled to the eye tracking system 645 to obtain eye tracking information determined by the eye tracking system 645. The varifocal module 650 may be configured to adjust focus of one or more images displayed on the electronic display 625, based on the determined eye tracking information obtained from the eye tracking system 645. In this way, the varifocal module 650 can mitigate vergence-accommodation conflict in relation to image light. The varifocal module 650 can be interfaced (e.g., either mechanically or electrically) with at least one of the electronic display 625 and at least one optical element of the optical assembly 630. Then, the varifocal module 650 may be configured to adjust focus of the one or more images displayed on the electronic display 625 by adjusting position of at least one of the electronic display 625 and the at least one optical element of the optical assembly 630, based on the determined eye tracking information obtained from the eye tracking system 645. By adjusting the position, the varifocal module 650 varies focus of image light output from the electronic display 625 towards the user's eye. The varifocal module 650 may be also configured to adjust resolution of the images displayed on the electronic display 625 by performing foveated rendering of the displayed images, based at least in part on the determined eye tracking information obtained from the eye tracking system 645. In this case, the varifocal module 650 provides appropriate image signals to the electronic display 625. The varifocal module 650 provides image signals with a maximum pixel density for the electronic display 625 only in a foveal region of the user's eye-gaze, while providing image signals with lower pixel densities in other regions of the electronic display 625. In some embodiments, the varifocal module 650 is coupled to the DCA 620. In one embodiment, the varifocal module 650 may utilize the depth information obtained by the DCA 620 to, e.g., generate content for presentation on the electronic display 625. In other embodiment, the varifocal module 650 may control scanning and sensing operations of the DCA 620. For example, the varifocal module 650 may control what portion of a local area surrounding the DCA 620 is being scanned and sensed based in part on information about vergence and/or accommodation of the user's eye in order to mitigate vergence-accommodation conflict.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the HMD 605 for processing in accordance with information received from one or more of: the DCA 620, the HMD 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the HMD 605 or the I/O interface 615. Examples of applications include: gaming applications, conferencing applications, video playback applications, or other suitable applications.

The tracking module 660 calibrates the HMD system 600 using one or more calibration parameters and may adjust one or more calibration parameters to reduce error in determination of the position of the HMD 605 or of the I/O interface 615. For example, the tracking module 660 communicates a calibration parameter to the DCA 620 to adjust the focus of the DCA 620 to more accurately determine positions of structured light elements captured by the DCA 620. Calibration performed by the tracking module 660 also accounts for information received from the IMU 640 in the HMD 605 and/or an IMU 640 included in the I/O interface 615. Additionally, if tracking of the HMD 605 is lost (e.g., the DCA 620 loses line of sight of at least a threshold number of structured light elements), the tracking module 660 may re-calibrate some or all of the HMD system 600.

The tracking module 660 tracks movements of the HMD 605 or of the I/O interface 615 using information from the DCA 620, the one or more position sensors 635, the IMU 640 or some combination thereof. For example, the tracking module 650 determines a position of a reference point of the HMD 605 in a mapping of a local area based on information from the HMD 605. The tracking module 660 may also determine positions of the reference point of the HMD 605 or a reference point of the I/O interface 615 using data indicating a position of the HMD 605 from the IMU 640 or using data indicating a position of the I/O interface 615 from an IMU 640 included in the I/O interface 615, respectively. Additionally, in some embodiments, the tracking module 660 may use portions of data indicating a position or the HMD 605 from the IMU 640 as well as representations of the local area from the DCA 620 to predict a future location of the HMD 605. The tracking module 660 provides the estimated or predicted future position of the HMD 605 or the I/O interface 615 to the engine 655.

The engine 665 generates a 3D mapping of the area surrounding some or all of the HMD 605 (i.e., the "local area") based on information received from the HMD 605. In some embodiments, the engine 665 determines depth information for the 3D mapping of the local area based on information received from the DCA 620 that is relevant for techniques used in computing depth. The engine 665 may calculate depth information using one or more techniques in computing depth from the portion of the reflected polarized light detected by the DCA 620, such as the structured light illumination technique and the time-of-flight technique. In various embodiments, the engine 665 uses the depth information to, e.g., update a model of the local area, and generate content based in part on the updated model.

The engine 665 also executes applications within the HMD system 600 and receives position information, acceleration information, velocity information, predicted future positions, or some combination thereof, of the HMD 605 from the tracking module 660. Based on the received information, the engine 665 determines content to provide to the HMD 605 for presentation to the user. For example, if the received information indicates that the user has looked to the left, the engine 665 generates content for the HMD 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the HMD 605 or haptic feedback via the I/O interface 615.

In some embodiments, based on the eye tracking information (e.g., orientation of the user's eye) received from the eye tracking system 645, the engine 665 determines resolution of the content provided to the HMD 605 for presentation to the user on the electronic display 625. The engine 665 provides the content to the HMD 605 having a maximum pixel resolution on the electronic display 625 in a foveal region of the user's gaze, whereas the engine 665 provides a lower pixel resolution in other regions of the electronic display 625, thus achieving less power consumption at the HMD 605 and saving computing cycles of the console 610 without compromising a visual experience of the user. In some embodiments, the engine 665 can further use the eye tracking information to adjust where objects are displayed on the electronic display 625 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A steering assembly comprising:
    a first non-mechanical steering element configured to function as a diffraction grating that performs, within a first angular spread, diffraction of one or more optical beams emitted from an illumination source; and
    a second non-mechanical steering element in an optical series with the first non-mechanical steering element and separated from the first non-mechanical steering element, the second non-mechanical steering element configured to function as a deflection element that performs, within a second angular spread that is more than double relative to the first angular spread, deflection of the one or more diffracted optical beams to generate outgoing light illuminating a local area.

2. The steering assembly of claim 1, wherein:
    the first non-mechanical steering element is configured to diffract the one or more optical beams at a first diffraction angle of the first angular spread to generate the one or more diffracted optical beams; and
    the second non-mechanical steering element is configured to deflect the one or more diffracted optical beams at a second deflection angle of the second angular spread to generate the outgoing light, the second deflection angle larger than the first diffraction angle.

3. The steering assembly of claim 1, wherein the first non-mechanical steering element comprises an acousto-optic device configured to function as the diffraction grating.

4. The steering assembly of claim 3, wherein the acousto-optic device comprises a transducer and a diffraction area, and responsive to a radio frequency, the transducer is configured to generate a sound wave in the diffraction area to form the diffraction grating.

5. The steering assembly of claim 4, wherein the radio frequency is modified to adjust a diffraction angle within the first angular spread at which the one or more optical beams are diffracted by the acousto-optic device.

6. The steering assembly of claim 1, wherein the first non-mechanical steering element comprises an acousto-optic device configured to function as the diffraction grating operating in the Bragg regime or in the Raman-Nath regime.

7. The steering assembly of claim 1, wherein the first non-mechanical steering element comprises a pair of acousto-optic devices configured to function as the diffraction grating and having axes of orientation orthogonal to each other.

8. The steering assembly of claim 1, further comprising a cylindrical lens in front of the first non-mechanical steering element, the cylindrical lens configured to produce a line scan across the first non-mechanical steering element.

9. The steering assembly of claim 1, wherein the second non-mechanical steering element comprises a pair of scanning lenses configured to function as the deflection element, a size of the second angular spread depending on a design of each of the scanning lenses.

10. The steering assembly of claim 1, wherein the second non-mechanical steering element comprises as a liquid lens deflector configured to function as the deflection element.

11. The steering assembly of claim 10, wherein the liquid lens deflector includes a deflection area with one or more types of liquid crystals, a deflection angle of the one or more diffracted optical beams varying within the second angular spread based on an electrical field applied to the deflection area.

12. The steering assembly of claim 1, wherein the second non-mechanical steering element comprises a polarization grating stack configured to function as the deflection element.

13. The steering assembly of claim 12, wherein the polarization grating stack includes at least one liquid crystal half-waveplate in an optical series with at least one polarization grating.

14. The steering assembly of claim 13, wherein the at least one polarization grating is implemented as a Pancharatnam-Berry Phase liquid crystal grating or a thin film prism.

15. The steering assembly of claim 1, wherein the second angular spread is more than three times larger than the first angular spread.

16. A method comprising:
    generating emission instructions by a processor;
    providing the emission instructions to a first non-mechanical steering element configured to function as a diffraction grating;
    providing the emission instructions to a second non-mechanical steering element in an optical series with the first non-mechanical steering element and separated from the first non-mechanical steering element, the second non-mechanical steering element configured to function as a deflection element;
    generating one or more first order diffracted scanning beams from one or more optical beams emitted from an illumination source by performing, within a first angular spread and based in part on the emission instructions, diffraction of the one or more optical beams using the first non-mechanical steering element; and
    generating outgoing light by performing, within a second angular spread that is more than double relative to the first angular spread and based in part on the emission instructions, deflection of the one or more first order diffracted scanning beams using the second non-mechanical steering element to form the outgoing light for projection into a local area.

17. The method of claim 16, further comprising:
generating the one or more first order diffracted scanning beams by diffracting the one or more optical beams at a first diffraction angle of the first angular spread; and
generating the outgoing light by deflecting the one or more first order diffracted scanning beams at a second deflection angle of the second angular spread larger than the first diffraction angle.

18. The method of claim 16, further comprising:
generating the emission instructions including information about a radio frequency;
generating a sound wave to configure the first non-mechanical steering element to function as the diffraction grating, based on the information about the radio frequency; and
modifying the radio frequency to adjust a diffraction angle within the first angular spread at which the one or more optical beams are diffracted to form the one or more first order diffracted scanning beams.

19. The method of claim 16, further comprising:
providing the emission instructions to the second non-mechanical steering element by applying a voltage to a deflection area of the second non-mechanical steering element implemented as a liquid lens deflector, the deflection area including one or more types of liquid crystals; and
varying a deflection angle of the one or more first order diffracted scanning beams within the second angular spread by varying an electrical field applied to the deflection area based on a level of the applied voltage.

20. A depth camera assembly (DCA) comprising:
a first non-mechanical steering element configured to function as a diffraction grating that performs, within a first angular spread, diffraction of one or more optical beams emitted from an illumination source;
a second non-mechanical steering element in an optical series with the first non-mechanical steering element and separated from the first non-mechanical steering element, the second non-mechanical steering element configured to function as a deflection element that performs, within a second angular spread that is more than double relative to the first angular spread, deflection of the one or more diffracted optical beams to generate outgoing light illuminating a local area;
an imaging sensor configured to capture one or more images of the local area including reflected light composed of portions of the outgoing light reflected from one or more objects in the local area; and
a processor configured to determine depth information for the one or more objects in the local area based in part on the one or more images captured by the imaging sensor.

* * * * *